(12) United States Patent
Kim et al.

(10) Patent No.: US 12,710,675 B2
(45) Date of Patent: Aug. 18, 2026

(54) DISPLAY DEVICE

(71) Applicant: LG ELECTRONICS INC., Seoul (KR)

(72) Inventors: Seungse Kim, Seoul (KR); Woongjoon Hwang, Seoul (KR); Geunhwan Kim, Seoul (KR); Seungsu Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/866,739

(22) PCT Filed: Nov. 11, 2022

(86) PCT No.: PCT/KR2022/017726

§ 371 (c)(1),
(2) Date: Nov. 18, 2024

(87) PCT Pub. No.: WO2023/224189

PCT Pub. Date: Nov. 23, 2023

(65) Prior Publication Data

US 2025/0314927 A1 Oct. 9, 2025

(30) Foreign Application Priority Data

May 19, 2022 (KR) ........................ 10-2022-0061549

(51) Int. Cl.

| | |
|---|---|
| ***G02F 1/13357*** | (2006.01) |
| ***G02B 5/02*** | (2006.01) |
| ***G02F 1/1335*** | (2006.01) |

(52) U.S. Cl.

CPC ..... *G02F 1/133606* (2013.01); *G02B 5/0242* (2013.01); *G02F 1/133611* (2013.01); *G02F 1/133614* (2021.01); *G02F 1/133615* (2013.01)

(58) Field of Classification Search

CPC ......... G02F 1/133606; G02F 1/133611; G02F 1/133614; G02B 5/0236; G02B 5/0242; G02B 5/0247

See application file for complete search history.

(56) References Cited

U.S. PATENT DOCUMENTS

| | | | | |
|---|---|---|---|---|
| 2007/0171671 | A1* | 7/2007 | Kurokawa | B32B 27/18 362/333 |
| 2011/0037736 | A1* | 2/2011 | Epstein | G02F 1/133611 345/204 |
| 2021/0033926 | A1* | 2/2021 | Lim | G02F 1/133603 |

FOREIGN PATENT DOCUMENTS

| | | |
|---|---|---|
| JP | 2003-215351 | 7/2003 |
| JP | 2019-214741 | 12/2019 |

(Continued)

OTHER PUBLICATIONS

PCT International Application No. PCT/KR2022/017726, International Search Report dated Mar. 7, 2023, 4 pages.

(Continued)

*Primary Examiner* — Sean P Gramling
(74) *Attorney, Agent, or Firm* — LEE, HONG, DEGERMAN, KANG & WAIMEY

(57) ABSTRACT

Disclosed is a display device. The display device includes: a display panel; an optical assembly which provides blue light to the display panel; and a diffusion plate which includes an absorption layer that is located between the display panel and the optical assembly, and absorbs light having a wavelength of certain range, in which, in a light provided to the display panel through the absorption layer, a radiant flux of green light series is 20% to 70%, and a radiant flux of red light series is 20% to 70%, based on a radiant flux of blue light series 100%, in which the diffusion plate includes: a core plate having light-transmitting properties; and a skin layer located on a lower surface of the core (Continued)

plate, in which the absorption layer is opposite to the skin layer with respect to the core plate.

6 Claims, 28 Drawing Sheets

(56) References Cited

FOREIGN PATENT DOCUMENTS

| | | |
|---|---|---|
| KR | 10-2011-0026904 | 3/2011 |
| KR | 10-1251815 | 4/2013 |
| KR | 10-1256668 | 4/2013 |
| KR | 10-2015-0014194 | 2/2015 |
| KR | 10-2015-0040608 | 4/2015 |
| KR | 10-2018-0101111 | 9/2018 |
| KR | 10-2020-0047872 | 5/2020 |

OTHER PUBLICATIONS

Korean Intellectual Property Office Application No. 10-2024-7038427, Office Action dated May 21, 2025, 7 pages.

Korean Intellectual Property Office Application No. 10-2024-7038427, Notice of Allowance dated Oct. 28, 2025, 2 pages.

* cited by examiner

DISPLAY DEVICE

CROSS-REFERENCE TO RELATED APPLICATIONS

This application is the National Stage filing under 35 U.S.C. 371 of International Application No. PCT/KR2022/017726, filed on Nov. 11, 2022, which claims the benefit of earlier filing date and right of priority to Korean Application No. 10-2022-0061549, filed on May 19, 2022, the contents of which are all hereby incorporated by reference herein in their entireties.

TECHNICAL FIELD

The present disclosure relates to a display device.

BACKGROUND ART

As information society develops, the demand for display devices is also increasing in various forms. In response to this, various display devices such as Liquid Crystal Display Device (LCD), Organic Light Emitting Diode (OLED), and Micro LED have been researched and used in recent years.

Among these, a liquid crystal panel includes a TFT substrate and a color filter substrate that face each other with a liquid crystal layer interposed therebetween, and may display an image by using light provided from a backlight unit.

Recently, as consumer demand for image quality of display devices increases, color expression or color reproducibility close to true color is receiving significant attention, and much research is being conducted on improving image quality to implement true color.

DISCLOSURE

Technical Problem

An object of the present disclosure is to solve the above-described problems and other problems.

Another object of the present disclosure is to provide a display device capable of improving image quality.

Another object of the present disclosure is to provide a display device capable of improving color reproducibility.

Another object of the present disclosure is to provide a display device capable of expressing a high luminance image.

Another object of the present disclosure is to provide a display device capable of minimizing luminance difference.

Technical Solution

According to an aspect of the present disclosure, there is provided a display device including: a display panel; an optical assembly which provides blue light to the display panel; and a diffusion plate which includes an absorption layer that is located between the display panel and the optical assembly, and absorbs light having a wavelength of certain range, in which, in a light provided to the display panel through the absorption layer, an intensity of green-based light is 20% to 70% of an intensity (100%) of the blue-based light, and an intensity of red-based light is 20% to 70% of the intensity (100%) of the blue-based light, in which the diffusion plate includes: a core plate having light-transmitting properties; and a skin layer located on a lower surface of the core plate, in which the absorption layer is opposite to the skin layer with respect to the core plate.

Advantageous Effects

The effects of the display device according to the present disclosure will be described as follows.

According to at least one of the embodiments of the present disclosure, the image quality of a display device can be improved.

In addition, according to at least one of the embodiments of the present disclosure, the color reproducibility can be improved.

In addition, according to at least one of the embodiments of the present disclosure, a display device capable of expressing a high luminance image can be provided.

In addition, according to at least one of the embodiments of the present disclosure, a display device capable of minimizing a luminance difference can be provided.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

DESCRIPTION OF DRAWINGS

FIGS. 8 to 10 are diagrams illustrating examples of a display device having a light absorption layer according to embodiments of the present disclosure.

FIGS. 11 to 23 are diagrams illustrating examples of a display device having a diffusion plate according to embodiments of the present disclosure.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as “module” and “unit” may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity.

The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

Hereinafter, a liquid crystal display device (LCD) is used as an example for a display panel, but the display panel applicable to the present disclosure is not limited to a liquid crystal display device.

Figure 1:
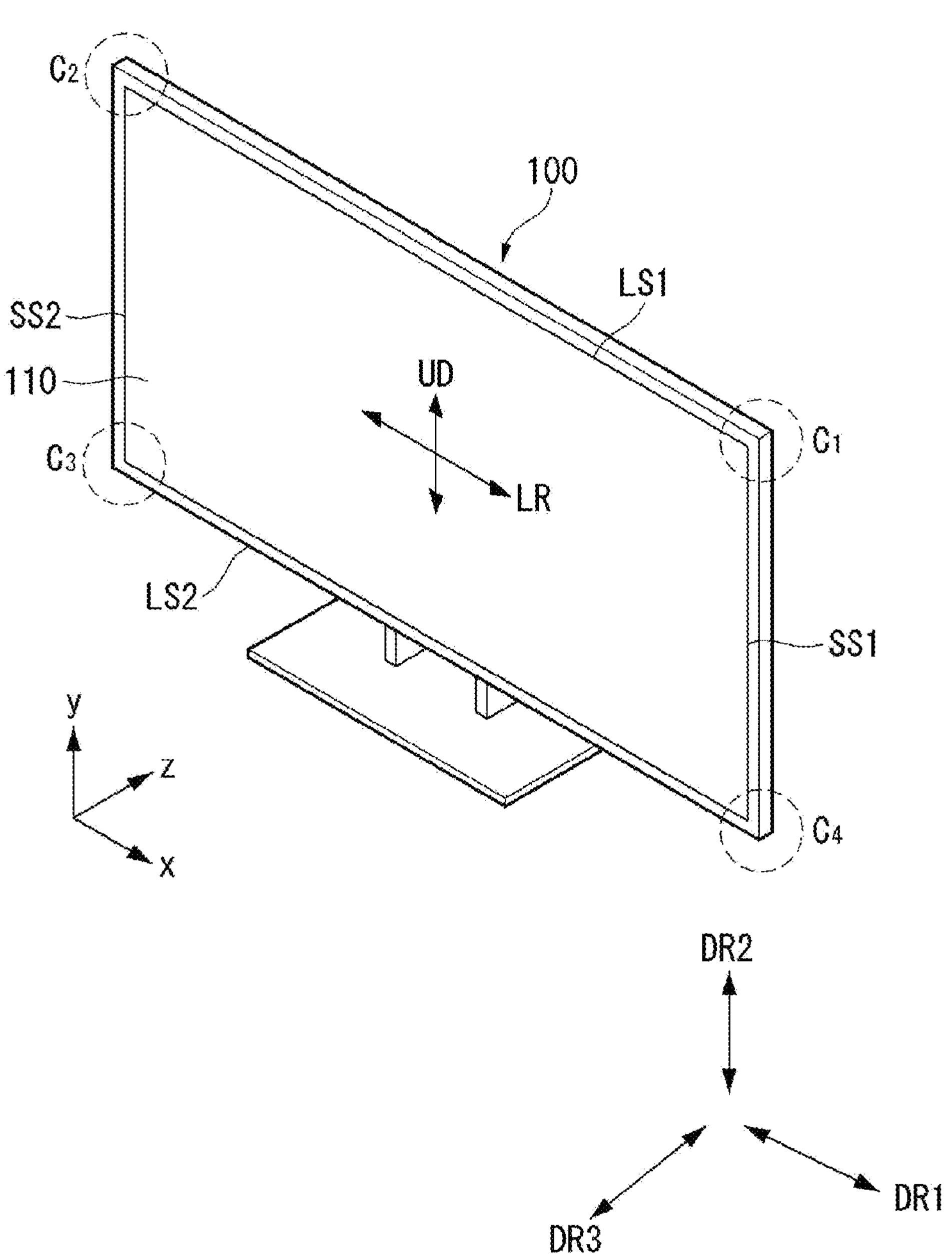
FIGS. 1 to 5 are diagrams illustrating examples of a display device according to embodiments of the present disclosure.

Referring to FIG. 1, a display device may include a first long side LS1, a second long side LS2 facing the first long side LS1, a first short side SS1 adjacent to the first long side LS1 and the second long side LS2, and a second short side SS2 facing the first short side SS1.

The first short side area SS1 may be referred to as a first side area, the second short side area SS2 may be referred to as a second side area facing the first side area, the first long side area LS1 may be referred to as a third side area which is adjacent to the first side area and the second side area and located between the first side area and the second side area, and the second long side area LS2 may be referred to as a fourth side area which is adjacent to the first side area and the second side area, located between the first side area and the second side area, and faces the third side area.

It is illustrated that the lengths of the first and second long sides LS1 and LS2 are longer than the lengths of the first and second short sides SS1 and SS2, but it may be possible that the lengths of the first and second long sides LS1 and LS2 are approximately the same as the lengths of the first and second short sides SS1 and SS2.

A first direction DR1 may be a direction parallel to the long side LS1, LS2 of the display panel 100, and a second direction DR2 may be a direction parallel to the short side SS1, SS2 of the display panel 100. A third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction.

A side on which a display device displays an image may be referred to as a forward direction or a front side or front surface. When a display device displays an image, the side from which an image cannot be observed may be referred to as a rearward direction or a rear side or rear surface. When the display is viewed from a forward direction or the front side, the side of the first long side LS1 may be referred to as an upper side or an upper surface. Similarly, the side of the second long side LS2 may be referred to as a lower side or a lower surface. Similarly, the side of the first short side SS1 may be referred to as a right side or a right surface, and the side of the second short side SS2 may be referred to as a left side or a left surface.

The first long side LS1, the second long side LS2, the first short side SS1, and the second short side SS2 may be referred to as an edge of the display device 1. In addition, a point where the first long side LS1, the second long side LS2, the first short side SS1, and the second short side SS2 meet each other may be referred to as a corner. For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

A direction from the first short side SS1 toward the second short side SS2 or a direction from the second short side SS2 toward the first short side SS1 may be referred to as a left-right direction LR. A direction from the first long side LS1 toward the second long side LS2 or a direction from the second long side LS2 toward the first long side LS1 may be referred to as a up-down direction UD.

Figure 2:
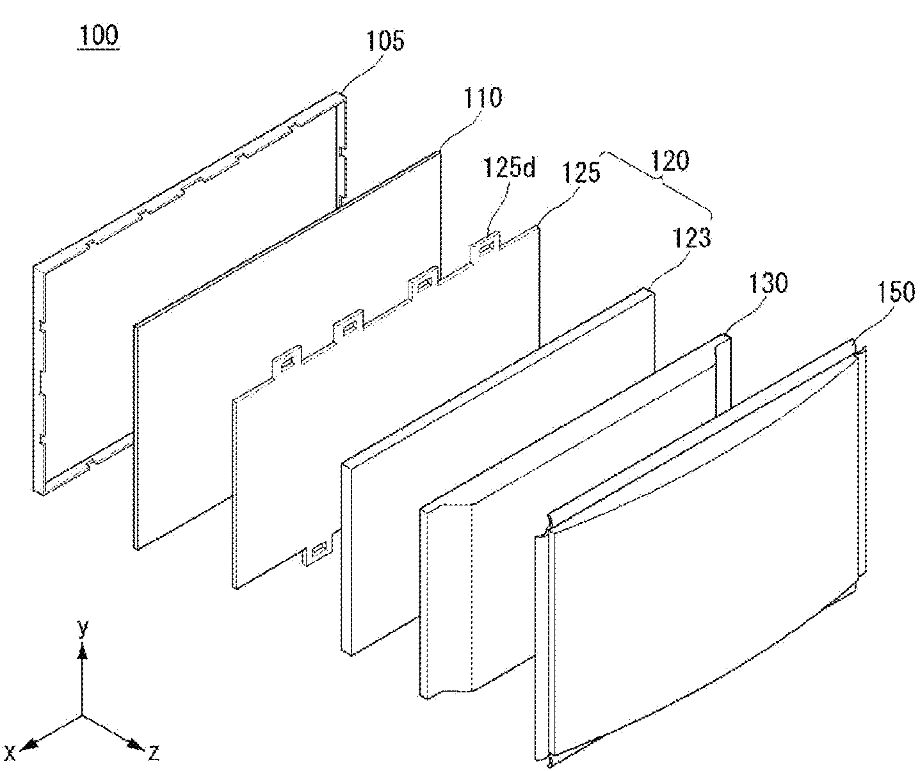

Referring to FIG. 2, a front cover 105 may cover at least a portion of the front and side surfaces of a display panel 110. The front cover 105 may be divided into a front cover located on the front surface side of the display panel 110 and a side cover located on the side surface side of the display panel 110. Either the front cover or the side cover may be omitted.

The display panel 110 is provided on the front surface of a display device 100 and may display an image. The display panel 110 may display an image by having multiple pixels output red, green or blue (RGB) for each pixel in accordance with the timing. The display panel 110 may be divided into an active area which displays an image and an inactive area which does not display an image. The display panel 110 may include front substrate and rear substrate that are opposite to each other with a liquid crystal layer interposed therebetween.

The front substrate may include a plurality of pixels including red R, green G, and blue B sub-pixels. The front substrate may generate light corresponding to a color of red, green, or blue according to a control signal.

The rear substrate may include switching elements. The rear substrate may switch a pixel electrode. For example, the pixel electrode may change the molecular arrangement of the liquid crystal layer according to an externally applied control signal. The liquid crystal layer may include liquid crystal molecules. The liquid crystal molecules may change their arrangement in response to a voltage difference generated between the pixel electrode and a common electrode. The liquid crystal layer may transmit provided from a backlight unit 120 to the front substrate or may block the light.

The backlight unit 120 may be located in a rear of the display panel 10. The backlight unit 120 may include light sources. The backlight unit 120 may be coupled to the frame 50 in front of the frame 50.

The backlight unit 120 may be driven by a full driving method or a partial driving method such as local dimming, and impulsive driving. The backlight unit 120 may include an optical sheet 125 and an optical layer 123. The optical layer 123 may be referred to as an optical module 123 or an optical unit 123.

The optical sheet 125 may evenly transmit light from the light source to the display panel 110. The optical sheet 125 may be composed of a plurality of layers. For example, the optical sheet 125 may include a prism sheet, a diffusion sheet, etc.

The optical sheet 125 may be provided with a coupling portion **125*d*. The coupling portion 125*d* may be coupled to the front cover 105, a frame 130, and/or a back cover 150. Alternatively, the coupling portion 125*d* may be fastened to a structure formed or coupled on the front cover 105, the frame 130, and/or the back cover 150**.

The frame 130 may serve to support components of the display device 100. For example, components such as a backlight unit 120 may be coupled to the frame 130. The frame 130 may be composed of a metal material such as an aluminum alloy.

The back cover 150 may be located at the rear surface or in a rearward direction of the display device 100. The back cover 150 may be coupled to the frame 130 and/or the front cover 105. For example, the back cover 150 may be an injection molded product made of a resin material.

Figure 3:
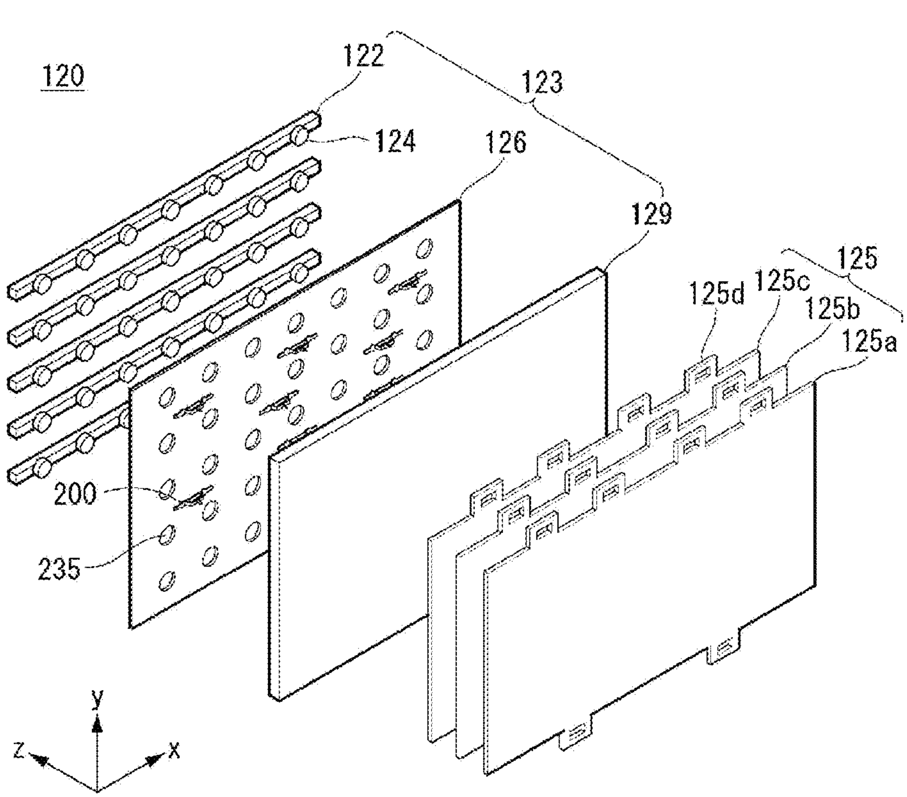

Referring to FIG. 3, the backlight unit 120 may include a substrate 122, at least one optical assembly 124, an optical layer 123 including a reflective sheet 126 and a diffusion plate 129, and an optical sheet 125 located on the front surface of the optical layer 123. The configuration of the backlight unit 120 is not limited thereto.

The substrate 122 may be configured in the form of a plurality of straps that extend in a first direction and are spaced apart at a certain interval in a second direction orthogonal to the first direction.

At least one optical assembly 124 may be mounted on the substrate 122. An electrode pattern for connecting an adapter and the optical assembly 124 may be formed on the substrate 122. For example, a carbon nanotube electrode pattern for connecting the optical assembly 124 and the adapter may be formed on the substrate 122.

The substrate 122 may be composed of at least one of polyethylene terephthalate PET, glass, polycarbonate PC, and silicon. The substrate 122 may be a Printed Circuit Board (PCB) on which at least one optical assembly 124 is mounted.

The optical assembly 124 may be arranged on the substrate 122 at a certain interval in the first direction. The diameter of the optical assembly 124 may be larger than the width of the substrate 122. That is, it may be larger than the length of the substrate 122 in the second direction.

The optical assembly 124 may be a light emitting diode (LED) chip or a light emitting diode package including at least one light emitting diode chip.

The optical assembly 124 may be composed of a colored LED that emits at least one color from among red, blue, and green, or composed of a white LED. The colored LED may include at least one of a red LED, a blue LED, and a green LED.

The reflective sheet 126 may be located on the front surface side of the substrate 122. The reflective sheet 126 may be located on an area of the substrate 122 excluding an area where the optical assembly 124 is formed. The reflective sheet 126 may have a plurality of holes 235.

The reflective sheet 126 may reflect light emitted from the optical assembly 124 toward the front surface side. In addition, the reflective sheet 126 may re-reflect light reflected from the diffusion plate 129.

The reflective sheet 126 may include at least one of a metal and a metal oxide, which are reflective materials. For example, the reflective sheet 126 may include a metal having a high reflectivity, such as at least one of aluminum Al, silver Ag, gold Au, and titanium dioxide TiO2 and/or metal oxide.

A resin may be deposited or applied on the optical assembly 124 and/or the reflective sheet 126. The resin may serve to diffuse light emitted from the optical assembly 124. The diffusion plate 129 may diffuse light emitted from the optical assembly 124 upward.

The optical sheet 125 may be located in front of the diffusion plate 129. The rear surface of the optical sheet 125 may be in close contact with the diffusion plate 129, and the front surface of the optical sheet 125 may be in close contact with or adjacent to the rear surface of the display panel 110.

The optical sheet 125 may include at least one sheet. In detail, the optical sheet 125 may include one or more prism sheets and/or one or more diffusion sheets. A plurality of sheets contained in the optical sheet 125 may be in an adhesive and/or close contact state.

The optical sheet 125 may be composed of a plurality of sheets having different functions. For example, the optical sheet 125 may include first to third optical sheets (125*a* to 125*c*). For example, a first optical sheet 125*a* may be a diffusion sheet, and second and third optical sheets 125*b*, 125*c* may be a prism sheet. The number and/or location of the diffusion sheet and the prism sheet may be changed.

The diffusion sheet may prevent light emitted from the diffusion plate from being partially concentrated, thereby making the distribution of light more uniform. The prism sheet may collect light emitted from the diffusion sheet and provide light to the display panel 110.

The coupling portion 125*d* may be formed on at least one of the sides or edges of the optical sheet 125. The coupling portion 125*d* may be formed on at least one of the first to third optical sheets (125*a* to 125*c*).

The coupling portion 125*d* may be formed on the long side of the optical sheet 125. The coupling portion 125*d* formed on the first long side and the coupling portion 125*d* formed on the second long side may be asymmetric. For example, the locations and/or numbers of the coupling portion 125*d* on the first long side and the coupling portion 125*d* on the second long side may be different from each other.

Figure 4:
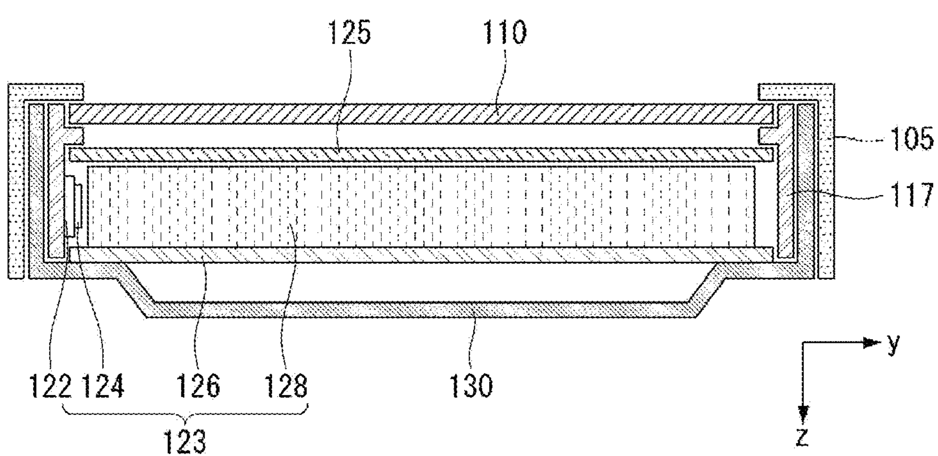

Referring to FIG. 4, the optical layer 123 may include a substrate 122, a reflective sheet 126, an optical assembly 124, and a light guide panel 128. The optical layer 123 may not include some of these configurations.

The optical layer 123 may be located in front of the frame 130. The optical layer 123 may be located between the frame 130 and the display panel 110. The optical layer 123 may be supported by the frame 130.

The substrate 122 may be located on one side of the frame 130. The substrate 124 may be located adjacent to a side surface of the reflective sheet 126 and/or the light guide panel 128. The optical assembly 124 mounted on the substrate 124 may provide light to the light guide panel 128. The light entering the light guide panel 128 may be directed to the display panel 110 by the light guide panel 128 and the reflective sheet 126.

Figure 5:
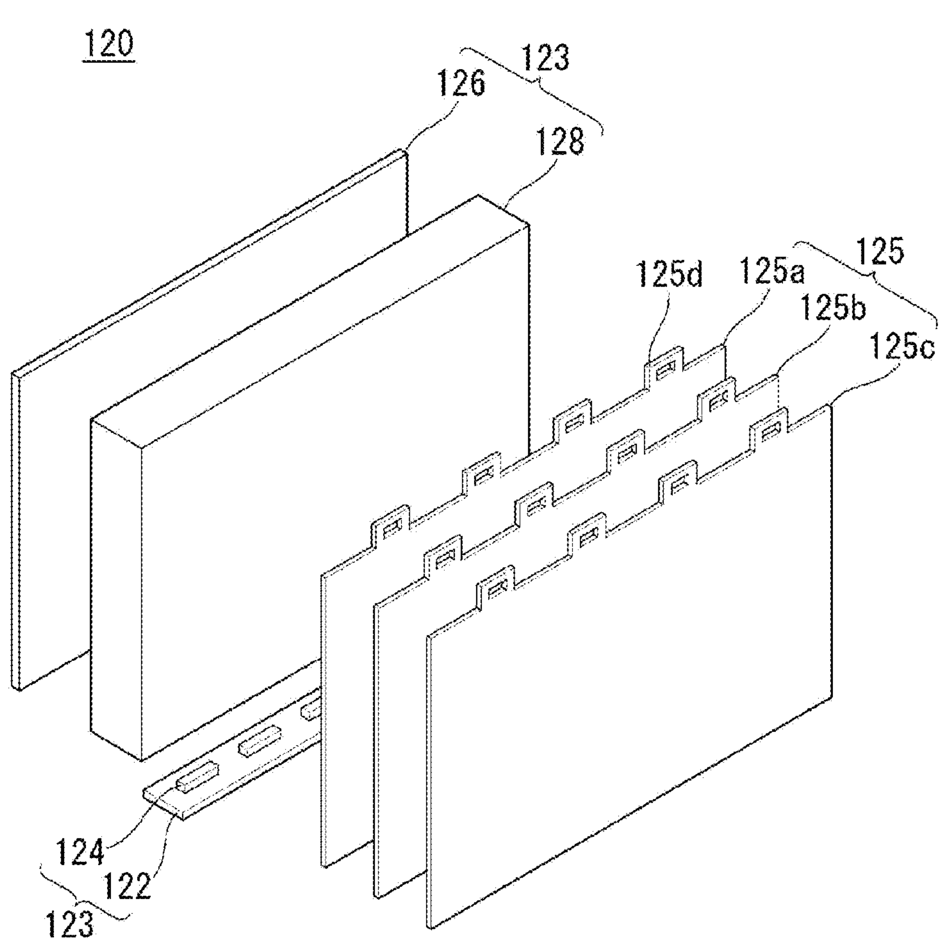

Referring to FIG. 5, the substrate 122 may be located on one side of another configuration of the optical layer 123. The optical assembly 124 or optical assemblies 124 may be mounted on the substrate 122. An electrode pattern for connecting an adapter and the optical assembly 124 may be formed on the substrate 122. For example, a carbon nanotube electrode pattern may be formed on the substrate 122 for connecting the optical assembly 124 and an adapter. For example, the substrate 122 may be a Printed Circuit Board (PCB).

The optical assemblies 124 may be arranged on the substrate 122 at a certain interval. The optical assembly 124 may be a light emitting diode (LED) chip or a light emitting diode package including at least one light emitting diode chip. The optical assembly 124 may be composed of a colored LED that emits at least one color from among red, blue, and green, or composed of a white LED.

The light source contained in the optical assembly 124 may be a Chip On Board (COB) type. The COB type may be a form in which an LED chip, which is a light source, is directly coupled to the substrate 122. This can simplify the process and lower the resistance, which in turn reduces the energy lost as heat. The COB type may provide brighter lighting. The COB type may be implemented thinner and lighter than conventional devices.

The light guide panel 128 may widely spread the light incident from the optical assembly 124. The reflective sheet 126 may be located between the light guide panel 128 and the frame 130. The reflective sheet 126 may reflect the light provided from the optical assembly 124. The reflective sheet 126 may reflect light coming from the light guide panel 128 back to the light guide panel 128.

The reflective sheet 126 may include at least one of a metal and a metal oxide, which are reflective materials. For example, the reflective sheet 126 may include a metal having a high reflectivity, such as at least one of aluminum Al, silver Ag, gold Au, and titanium dioxide TiO2 and/or metal oxide.

The reflective sheet 126 may be formed by depositing and/or coating a metal or metal oxide. The reflective sheet 126 may form a reflective layer by printing ink containing a metal material. The reflective sheet 126 may have a deposition layer using a vacuum deposition method such as a thermal deposition method, an evaporation method, or a sputtering method. The reflective sheet 126 may have a coating layer and/or a printing layer using a printing method, a gravure coating method, or a silk screen method.

A diffusion portion (not shown) may be formed on the front surface of the light guide panel. The diffusion portion may diffuse light emitted from the light guide panel 128 in a forward direction.

The optical sheet 125 may be located on the front side of the light guide panel 128. The rear surface of the optical sheet 125 may face the light guide panel 128, and the front surface of the optical sheet 125 may face the display panel 110.

The optical sheet 125 may include at least one sheet. The optical sheet 125 may include one or more prism sheets and/or one or more diffusion sheets. The plurality of sheets contained in the optical sheet 125 may be in a state of being adhered to and/or in close contact with each other.

For example, the optical sheet 125 may include first to third optical sheets (125*a* to 125*c*). The first optical sheet 125*a* may be a diffusion sheet, and the second and third optical sheets 125*b*, 125*c* may be a prism sheet. The number and/or location of the diffusion sheet and the prism sheet may be changed.

The diffusion sheet may prevent light emitted from the light guide panel 128 from being partially concentrated, thereby making the distribution of light more uniform. The prism sheet may collect light emitted from the diffusion sheet and provide light toward the display panel 110.

Figure 6:
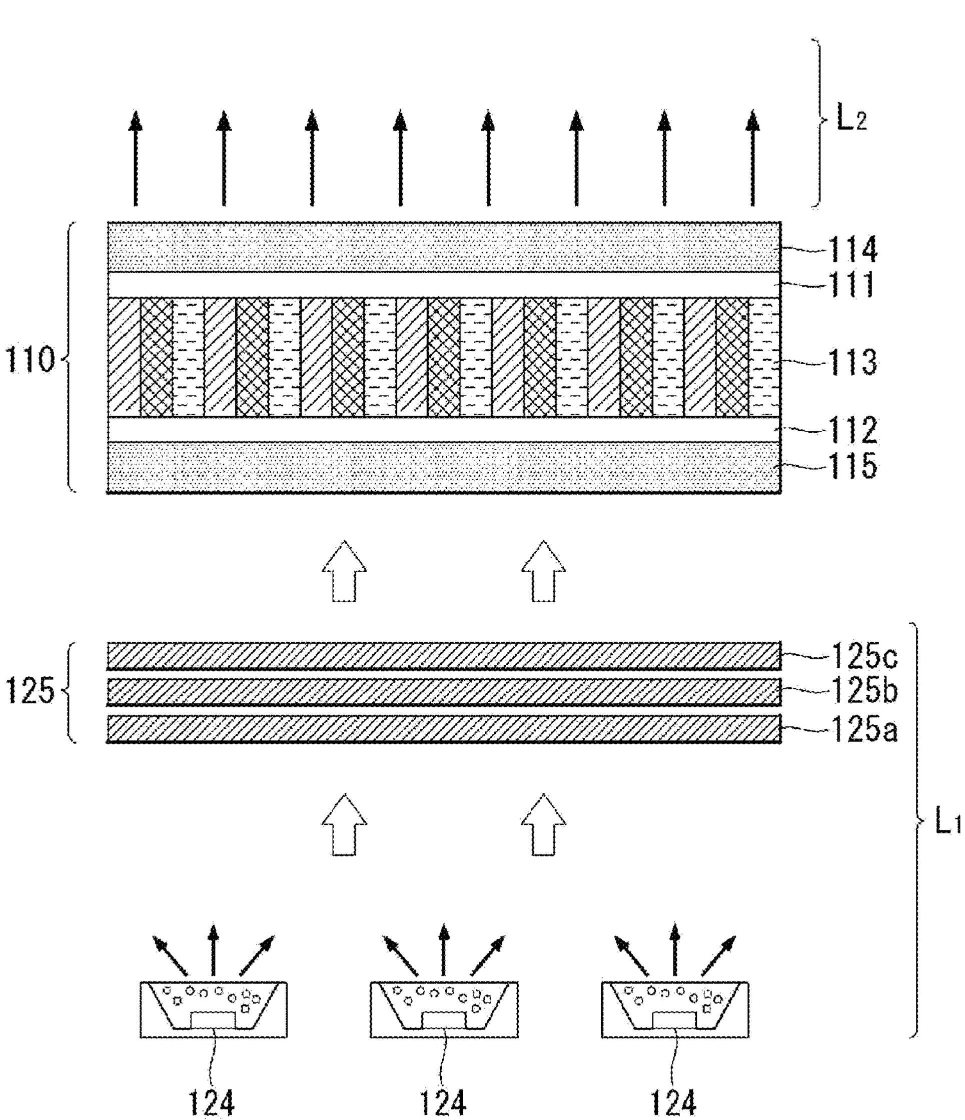
FIGS. 6 and 7 are diagrams illustrating an example of a spectrum of light of a light source that provides light to a display panel according to embodiments of the present disclosure.

Referring to FIG. 6, the optical assembly 124 may provide light to the optical sheet 125. The light dispersed and/or concentrated by the optical sheet 125 may be provided to the display panel 110. The display panel 110 may display an image using this light.

If the light provided from the optical assembly 124 before passing through the display panel 110 is referred to as L1, and the light passed through the display panel 110 is referred to as L2, L1 and L2 may have a different light spectrum.

Figure 7:
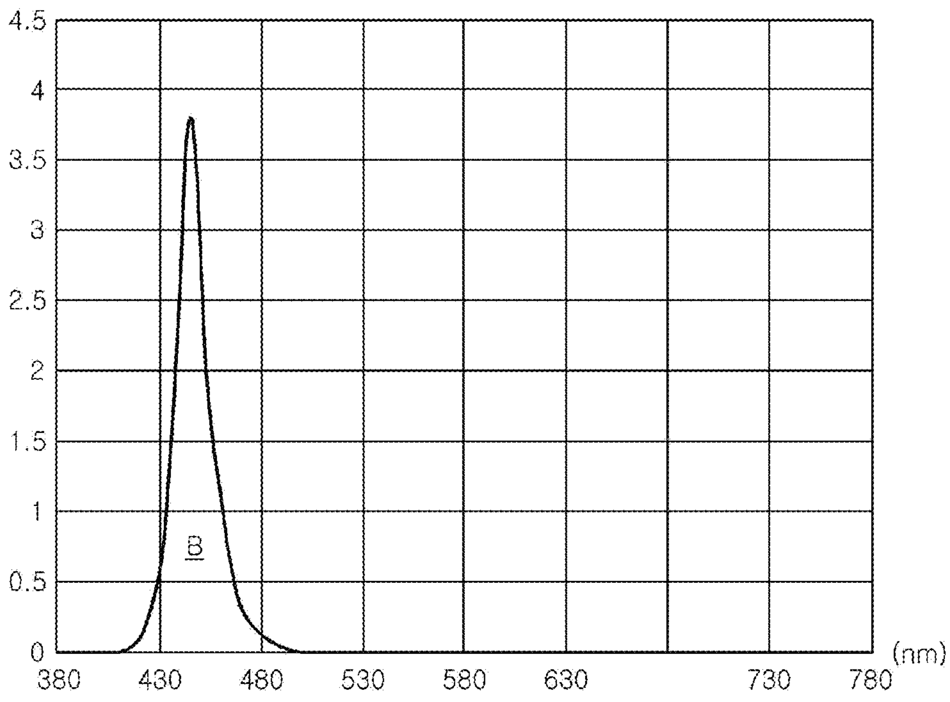

FIG. 7 may be an example of the spectrum of L1. The x-axis indicates the wavelength (nm) of the light, and the y-axis indicates the intensity (radiant flux) (W) of the light. B may be the radiant flux or distribution of blue light.

The optical assembly 124 (see FIG. 6) may be equipped with an LED as a light source. The LED may emit blue light. The light source 124, e.g. LED, may provide light L1 of a wavelength and/or radiant flux shown in FIG. 7.

For example, the optical assembly 124 may provide light of a blue series having a wavelength of 430 to 465 nm. In order for the light provided from the light source 124 to pass through the display panel 110 and implement high-purity color (high color expression), high-purity white light must be provided to the display panel 110 to implement good image quality.

Figure 8:
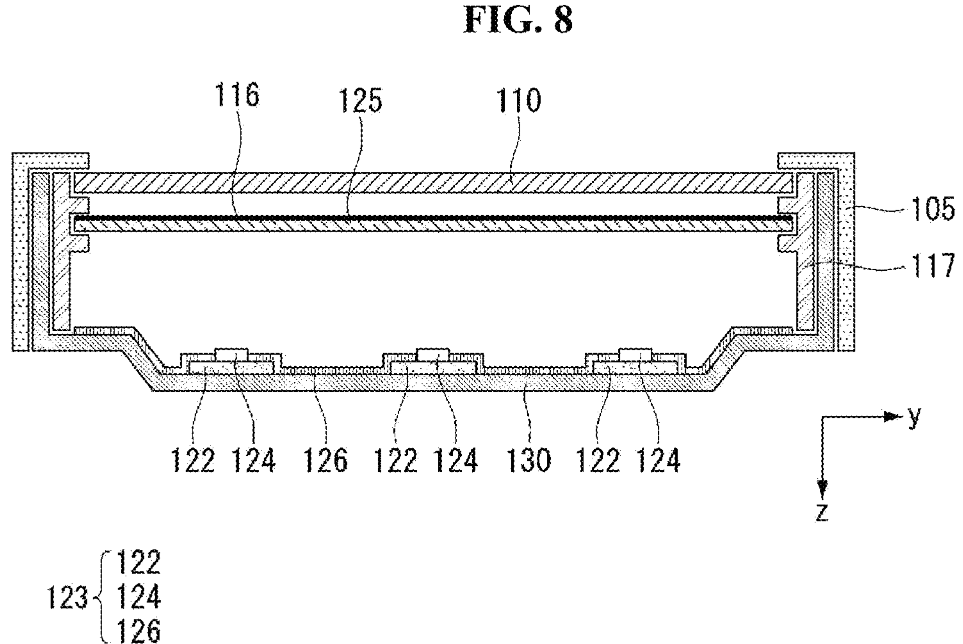

Referring to FIG. 8, a light absorption layer 116 may be located in front of the optical sheet 125 or may be formed, adhered, or deposited on the front surface of the optical sheet 125. The light absorption layer 116 may be on the path of light provided from the optical assembly 124 toward the display panel 110.

For example, the light absorption layer 116 may include a plurality of layers. The plurality of layers may be a Quantum Dot Enhancement Film (QD film) and/or a Nano Organic Film (NOF film).

Figure 9:
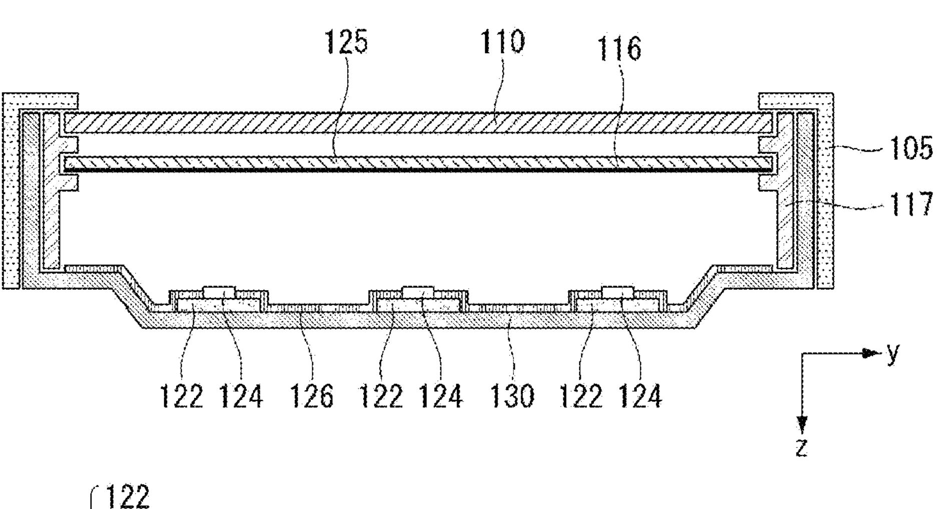

Referring to FIG. 9, the light absorption layer 116 may be located at the rear of the optical sheet 125 or may be formed, adhered, or deposited on the rear surface of the optical sheet 125. The light absorption layer 116 may be provided from the optical assembly 124 and may be located on the path of light toward the display panel 110.

For example, the light absorption layer 116 may include a Quantum Dot Enhancement Film (QD film) and/or a Nano Organic Film (NOF film).

Figure 10:
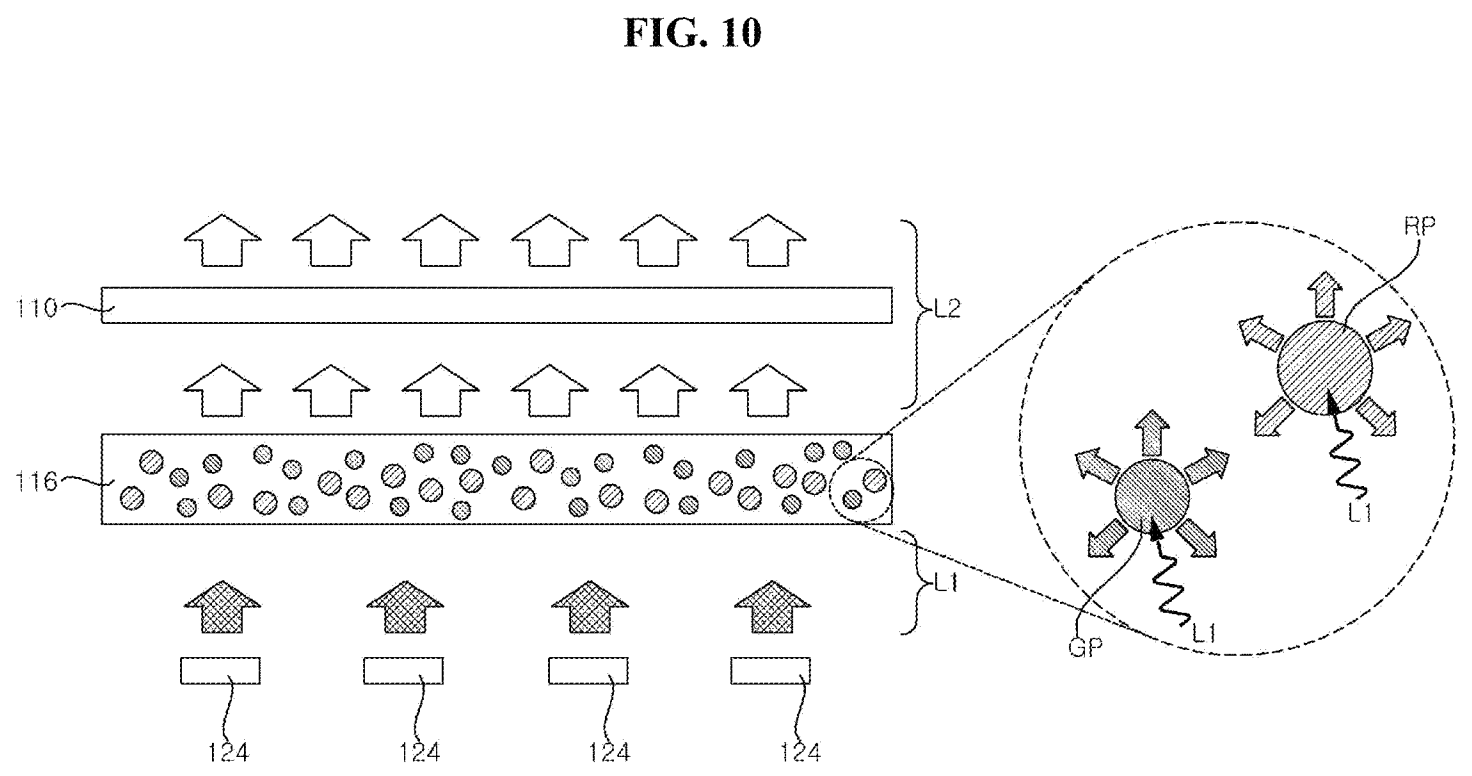

Referring to FIG. 10, the light absorption layer 116 may be located between the display panel 110 and the optical assembly 124. The light absorption layer 116 may include a green phosphor GP and a red phosphor RP. For example, the green phosphor GP may be a particle SrGa2S4: Eu of 3 to 7 micrometers, and the red phosphor RP may be a particle (Sr,Ca)AlSiN3: Eu of 1 micrometer or less.

The light L1 provided from the optical assembly 124 may excite, for example, a blue series light (see FIG. 7), and the green phosphor GP. The light L1 provided from the optical assembly 124 may excite, for example, a blue series light (see FIG. 7) and the red phosphor RP.

At this time, the light L1 (see FIG. 7) provided from the optical assembly 124 may have a light characteristic L1 in which the blue series light has a strong radiant flux, but may change into light L2 in which the radiant flux of the green series G light and the red series R light increases or is strengthened as it passes through the light absorption layer 116. For example, the light absorption layer 116 may absorb light in a wavelength range of 434 to 461 nm and light in a wavelength range of 524 to 557 nm.

Figure 11:
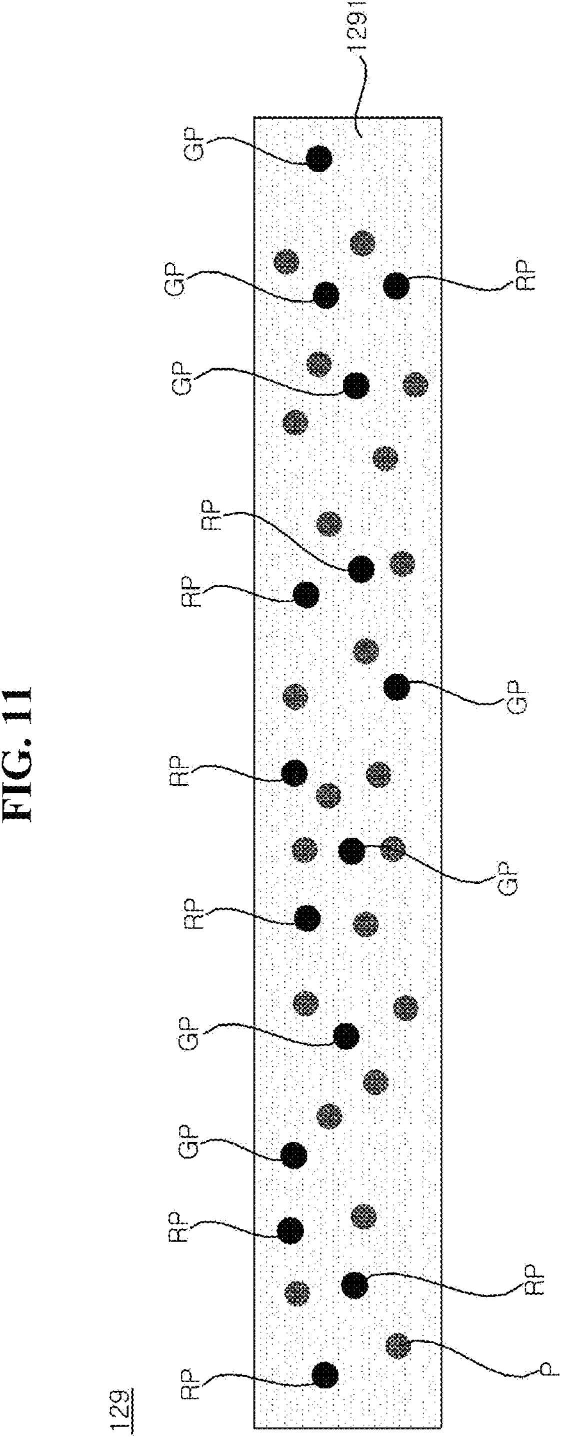

Referring to FIG. 11, a diffusion plate 129, 1291 may be a light-transmitting plate. The diffusion plate 129, 1291 may scatter or disperse light passing through the diffusion plate 129, 1291. The diffusion plate 129, 1291 may include phosphors GP, RP and diffusion particles P.

For example, the diffusion particles P may be micro particles that may scatter, disperse, or refract light passing through the diffusion plate 129, 1291. For another example, the refractive index of the diffusion plate 129, 1291 may be 1.5, and the refractive index of the diffusion particles P may be 1.42. For another example, the diffusion particles P may be organic Si beads.

For another example, the phosphors GP, RP may include a green phosphor GP and a red phosphor RP. The diffusion particles P and the phosphors GP, RP may be mixed within the diffusion plate 129, 1291. That is, the diffusion plate 129 may serve as an absorption layer 116 (see FIG. 10).

For example, the diffusion particles P may be 1 to 10 micrometers and may be micro particles formed of a synthetic resin. For example, the green phosphor GP may be a particle SrGa2S4: Eu of 3 to 7 micrometers, and the red phosphor RP may be a particle (Sr,Ca)AlSiN3: Eu of 1 micrometer or less.

Figure 12:
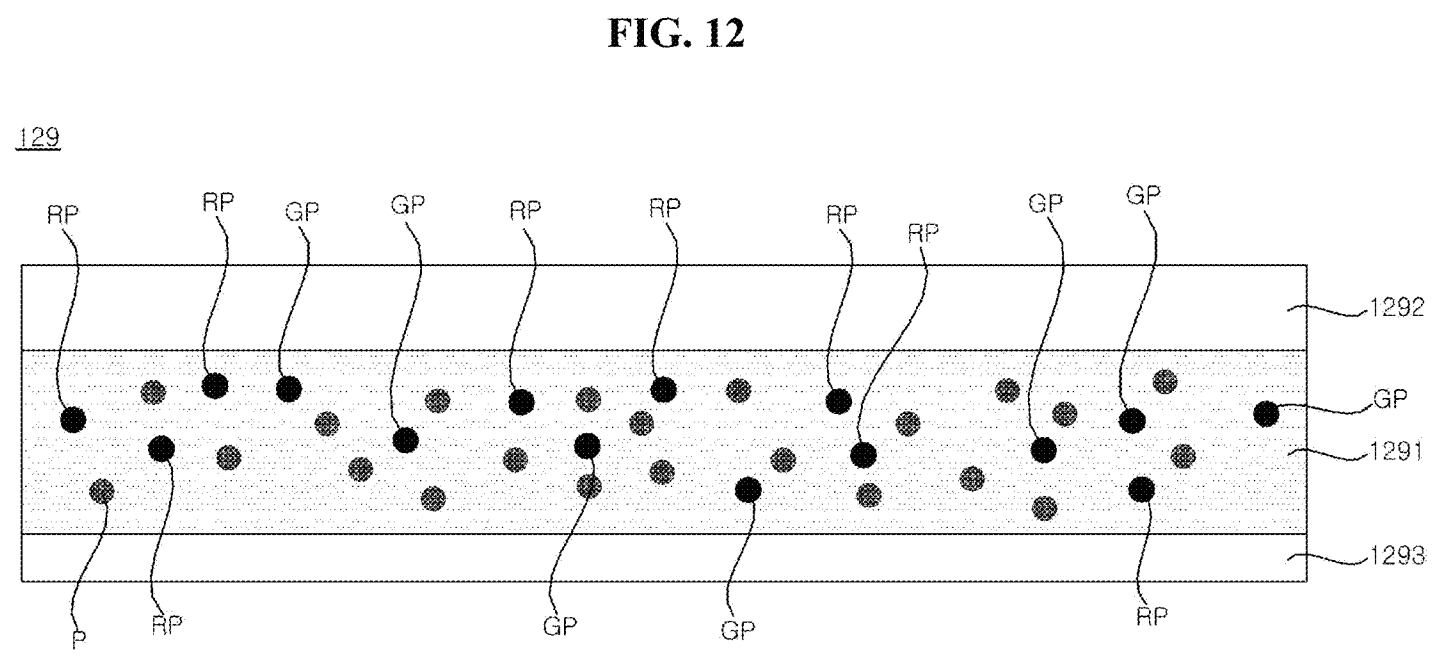

Referring to FIG. 12, the diffusion plate 129 may be a light-transmitting plate. The diffusion plate 129 may scatter or disperse light passing through the diffusion plate 129. The core plate 1291 may be a light-transmitting plate. A first skin 1292 may be applied to or laminated on the upper surface of the core 1291. For example, the first skin 1292 may be a transparent optical film. A second skin 1293 may be applied to or laminated on the lower surface of the core 1291. For example, the second skin 1293 may be a transparent optical film. The thickness of the first skin 1292 may be greater than the thickness of the second skin 1293. For another example, the thickness of the core 1291 may be greater than the thickness of the first skin 1292, and the thickness of the first skin 1292 may be greater than the thickness of the second skin 1293.

The core 1291 may include phosphors GP, RP and diffusion particles P. For example, the diffusion particles P may be microparticles that can scatter, disperse, or refract light passing through the diffusion plate 129. For another example, the refractive index of the diffusion plate 129, 1291 may be 1.5, and the refractive index of the diffusion particles P may be 1.42.

For another example, the phosphors GP, RP may include a green phosphor GP and a red phosphor RP. The diffusion particles P and the phosphors GP, RP may be mixed within the core 1291. That is, the core 1291 of the diffusion plate 129 may serve as an absorption layer 116 (see FIG. 10).

For example, the diffusion particles P may be 1 to 10 micrometers and may be micro particles formed of synthetic resin. For another example, the refractive index of the core 1291 may be 1.5 and the refractive index of the diffusion particles P may be 1.42. For another example, the diffusion particles P may be organic Si beads.

For example, the green phosphor GP may be a particle SrGa2S4: Eu of 3 to 7 micrometers, and the red phosphor RP may be a particle (Sr,Ca)AlSiN3: Eu of 1 micrometer or less.

Figure 13:
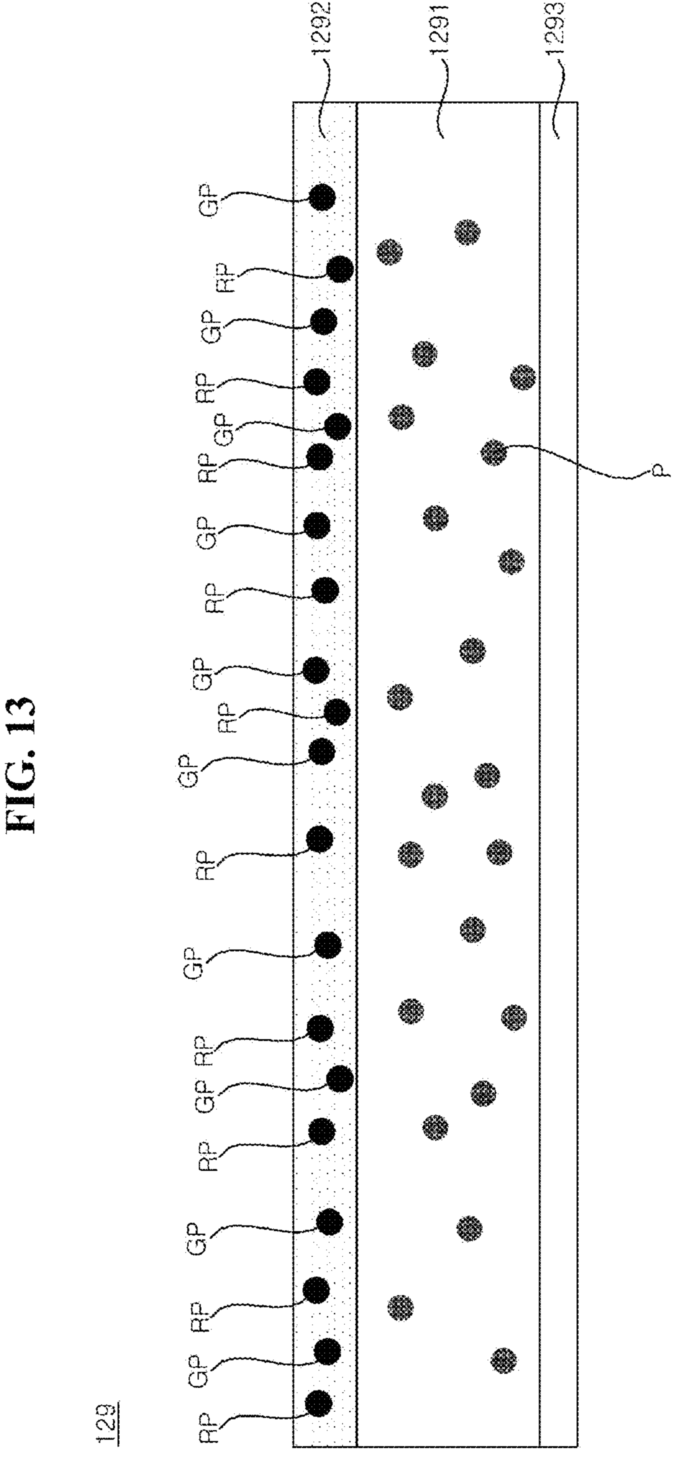

Referring to FIG. 13, the diffusion plate 129 may be a light-transmitting plate. The diffusion plate 129 may scatter or disperse light passing through the diffusion plate 129. The core plate 1291 may be a light-transmitting plate. The first skin 1292 may be applied to or laminated on the upper surface of the core 1291. For example, the first skin 1292 may be a transparent optical film. The second skin 1293 may be applied to or laminated on the lower surface of the core 1291. For example, the second skin 1293 may be a transparent optical film. The thickness of the first skin 1292 may be greater than the thickness of the second skin 1293. For another example, the thickness of the core 1291 may be greater than the thickness of the first skin 1292, and the thickness of the first skin 1292 may be greater than the thickness of the second skin 1293.

The core 1291 may include diffusion particles P. For example, the diffusion particles P may be microparticles that can scatter, disperse, or refract light passing through the diffusion plate 129.

For example, the diffusion particles P may be 1 to 10 micrometers and may be microparticles formed of a synthetic resin. For another example, the refractive index of the core 1291 may be 1.5, and the refractive index of the diffusion particles P may be 1.42. For another example, the diffusion particles P may be organic Si beads.

The first skin 1292 may include phosphors RP, GP. For another example, the phosphors GP, RP may include a green phosphor GP and a red phosphor RP. For example, the green phosphor GP may be a particle SrGa2S4: Eu of 3 to 7 micrometers, and the red phosphor RP may be a particle (Sr,Ca)AlSiN3: Eu of 1 micrometer or less. That is, the first skin 1292 may serve as a light absorption layer 116 (see FIG. 10).

Figure 14:
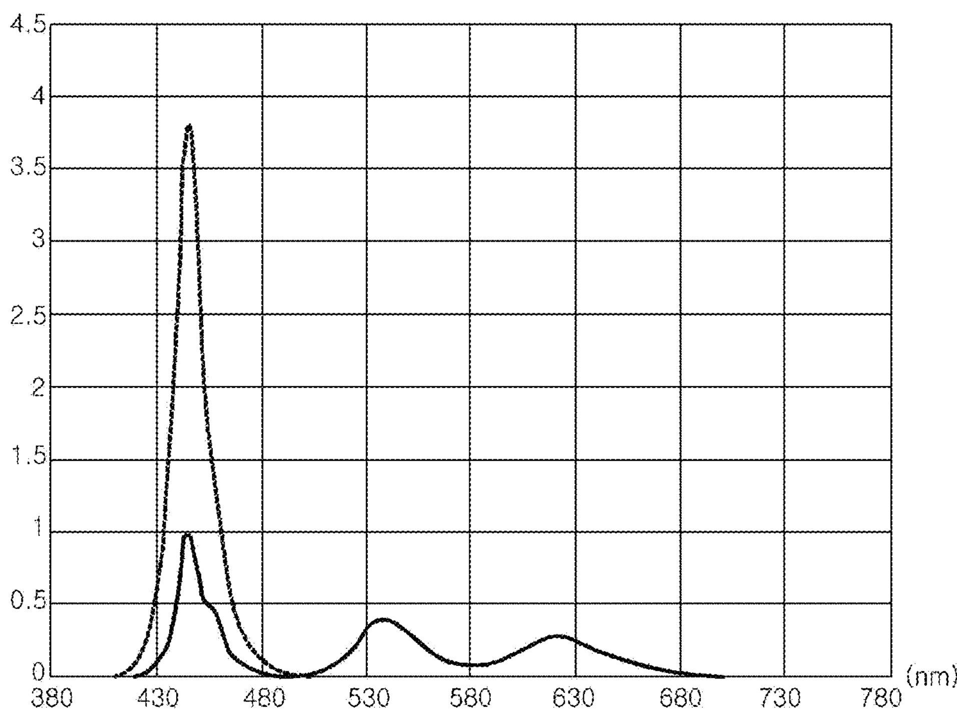

Referring to FIG. 14, an example (solid line) of light L2 described with reference to FIG. 10 is illustrated. It can be seen that the color reproducibility of the light L2 that passed through the light absorption layer 116 and the display panel 110 is improved as the lights of blue series B, green series G, and red series R are evenly distributed.

The wavelength of the peak (center) area of the blue light B may be, for example, 443 to 450 nm. The wavelength of the peak (center) area of the green light G may be, for example, 530 to 550 nm. The wavelength of the peak (center) area of the red light R may be, for example, 610 to 630 nm.

Figure 15:
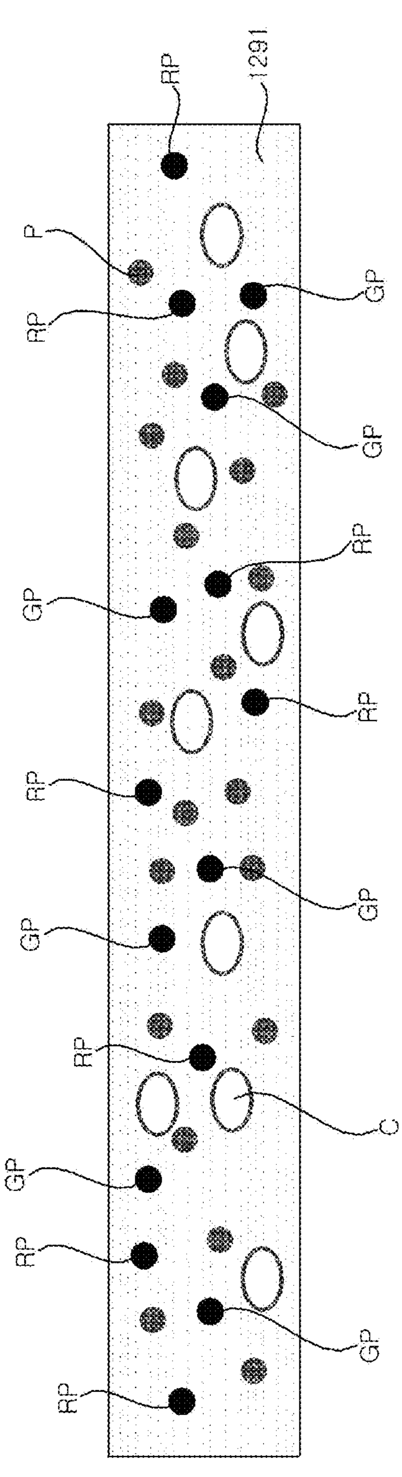

Referring to FIG. 15, the diffusion plate 129, 1291 may be a light-transmitting plate. The diffusion plate 129, 1291 may scatter, disperse, or refract light passing through the diffusion plate 129, 1291. The diffusion plate 129, 1291 may include phosphors GP, RP, diffusion particles P, and a cavity C. The cavity C may be referred to as an air-gap.

The cavity C may be formed by a foaming process during the curing process of the optical synthetic resin. The cavity C may be formed in various sizes. For example, the cavity C may be 10 to 100 micrometers. The cavity C may refract light passing through the diffusion plate 129. The refractive index of the cavity C may be different from the refractive index of the diffusion plate 129. For example, the refractive index of the diffusion plate 129 may be 1.5, and the refractive index of the cavity C may be 1.0.

For example, the diffusion particles P may be micro particles that may scatter, disperse, or refract light passing through the diffusion plate 129, 1291. For another example, the refractive index of the core 1291 may be 1.5, and the refractive index of the diffusion particles P may be 1.42. For another example, the diffusion particles P may be organic Si beads.

For another example, the phosphors GP, RP may include a green phosphor GP and a red phosphor RP. The diffusion particles P and the phosphors GP, RP may be mixed within the diffusion plate 129, 1291. That is, the diffusion plate 129 may serve as an absorption layer 116 (see FIG. 10).

Figure 16:
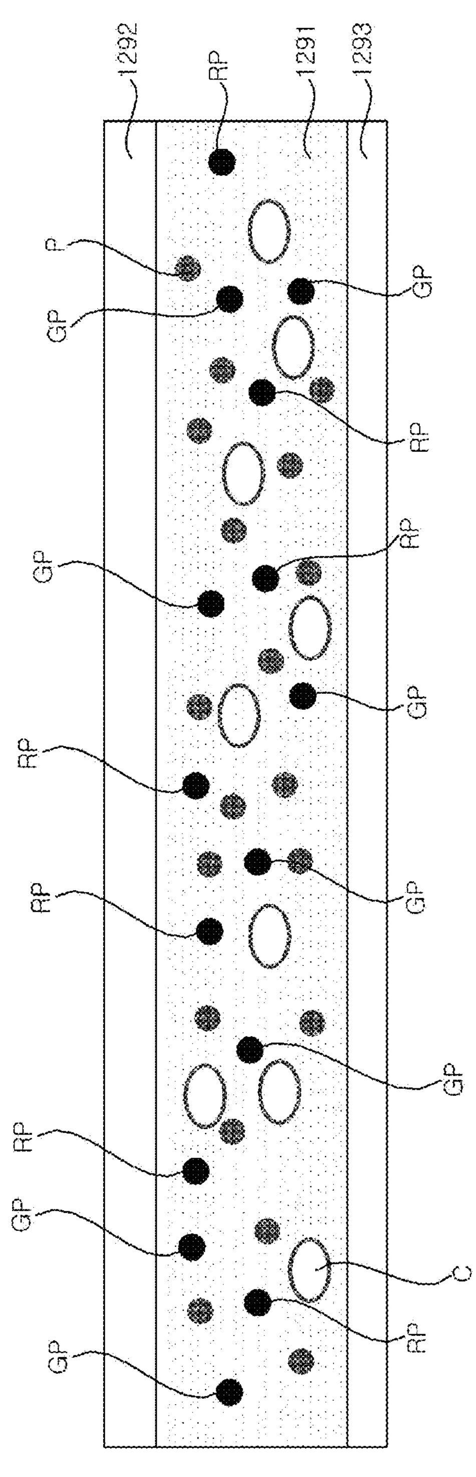

For example, the diffusion particles P may be 1 to 10 micrometers. For example, the green phosphor GP may be a particle SrGa2S4: Eu of 3 to 7 micrometers, and the red phosphor RP may be a particle (Sr,Ca)AlSiN3: Eu of 1 micrometer or less. Referring to FIG. 16, the diffusion plate 129 may be a light-transmitting plate. The diffusion plate 129 may scatter, disperse, or refract light passing through the diffusion plate 129.

The core plate 1291 may be a light-transmitting plate. The first skin 1292 may be applied to or laminated on the upper surface of the core 1291. For example, the first skin 1292 may be a transparent optical film. The second skin 1293 may be applied to or laminated on the lower surface of the core 1291. For example, the second skin 1293 may be a transparent optical film. The thickness of the first skin 1292 may be greater than the thickness of the second skin 1293. For another example, the thickness of the core 1291 may be greater than the thickness of the first skin 1292, and the thickness of the first skin 1292 may be greater than the thickness of the second skin 1293.

The core 1291 may include phosphors GP, RP, diffusion particles P, and a cavity C. The cavity C may be referred to as an air-gap.

The cavity C may be formed by a foaming process during the curing process of the optical synthetic resin. The cavity C may be formed in various sizes. For example, the cavity C may be 10 to 100 micrometers. The cavity C may scatter or refract light passing through the diffusion plate 129. The refractive index of the cavity C may be different from the refractive index of the core 1291. For example, the refractive index of the core 1291 may be 1.5, and the refractive index of the cavity C may be 1.0.

For example, the diffusion particles P may be micro particles that may scatter, disperse, or refract light passing through the diffusion plate 129, 1291. For another example, the refractive index of the core 1291 may be 1.5, and the refractive index of the diffusion particles P may be 1.42. For another example, the diffusion particles P may be organic Si beads.

For another example, the phosphors GP, RP may include a green phosphor GP and a red phosphor RP. The diffusion particles P and the phosphors GP, RP may be mixed within the core 1291. That is, the core 1291 of the diffusion plate 129 may serve as a light absorption layer 116 (see FIG. 10).

For example, the diffusion particles P may be 1 to 10 micrometers. For example, the green phosphor GP may be a particle SrGa2S4: Eu of 3 to 7 micrometers, and the red phosphor RP may be a particle (Sr,Ca)AlSiN3: Eu of 1 micrometer or less.

Figure 17:
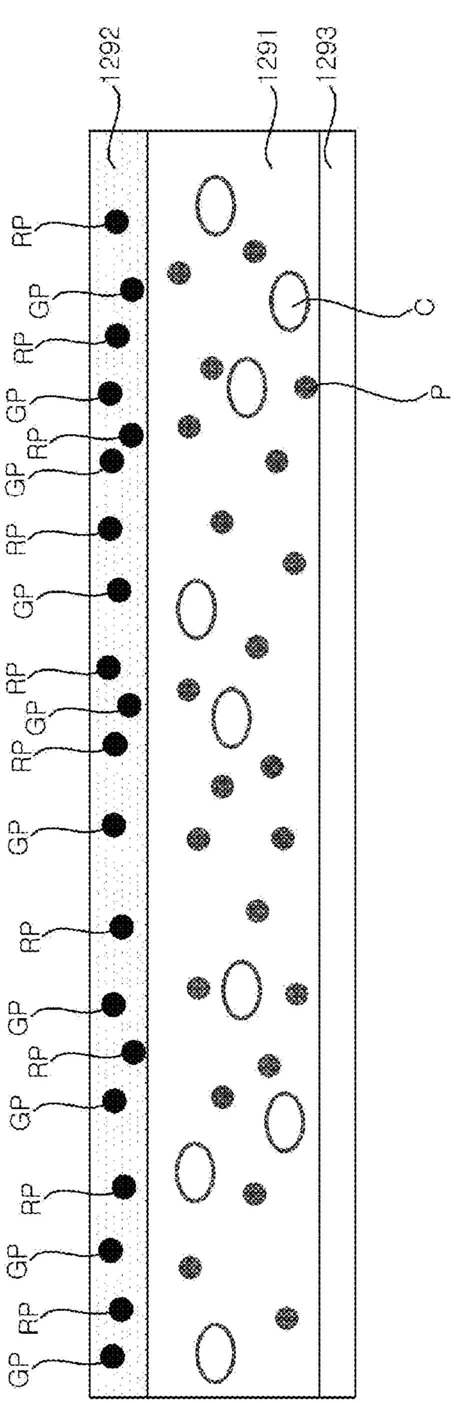

Referring to FIG. 17, the diffusion plate 129 may be a light-transmitting plate. The diffusion plate 129 may scatter, disperse, or refract light passing through the diffusion plate 129.

The core plate 1291 may be a light-transmitting plate. The first skin 1292 may be applied to or laminated on the upper surface of the core 1291. For example, the first skin 1292 may be a transparent optical film. The second skin 1293 may be applied to or laminated on the lower surface of the core 1291. For example, the second skin 1293 may be a transparent optical film. The thickness of the first skin 1292 may be greater than the thickness of the second skin 1293. For another example, the thickness of the core 1291 may be greater than the thickness of the first skin 1292, and the thickness of the first skin 1292 may be greater than the thickness of the second skin 1293.

The core 1291 may include diffusion particles P and a cavity C. The cavity C may be referred to as an air-gap.

The cavity C may be formed by a foaming process during the curing process of the optical synthetic resin. The cavity C may be formed in various sizes. For example, the cavity C may be 10 to 100 micrometers. The cavity C may scatter or refract light passing through the diffusion plate 129. The refractive index of the cavity C may be different from the refractive index of the core 1291. For example, the refractive index of the core 1291 may be 1.5, and the refractive index of the cavity C may be 1.0.

For example, the diffusion particles P may be microparticles that may scatter, disperse, or refract light passing through the diffusion plate 129, 1291. For another example, the refractive index of the core 1291 may be 1.5, and the refractive index of the diffusion particles P may be 1.42. For another example, the diffusion particles P may be organic Si beads.

The first skin 1292 may include phosphors GP, RP. The phosphors GP, RP may include a green phosphor GP and a red phosphor RP. That is, the first skin 1292 of the diffusion plate 129 may serve as a light absorption layer 116 (see FIG. 10).

For example, the diffusion particles P may be 1 to 10 micrometers. For example, the green phosphor GP may be a particle SrGa2S4: Eu of 3 to 7 micrometers, and the red phosphor RP may be a particle (Sr,Ca)AlSiN3: Eu of 1 micrometer or less.

Figure 18:
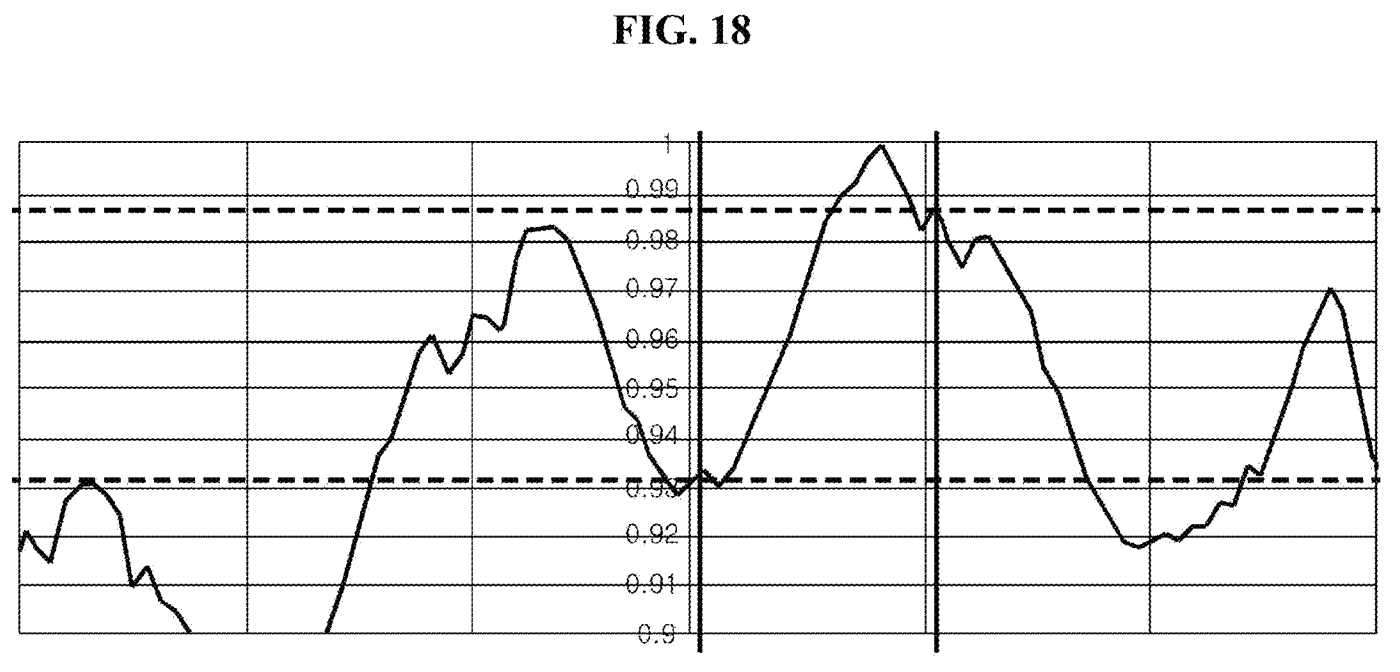

Referring to FIG. 18, it shows an example of the luminance difference in the case of a general diffusion plate 129 having a transmittance of 30%. The vertical axis is the luminance measured at a location between light sources, and the vertical solid line is the luminance measured from the light source. The horizontal dotted line indicates the luminance difference between light sources. It can be seen that the luminance difference of the light passing through the diffusion plate 129 is 5.6%. At this time, the total amount of luminance is 100%.

Figure 19:
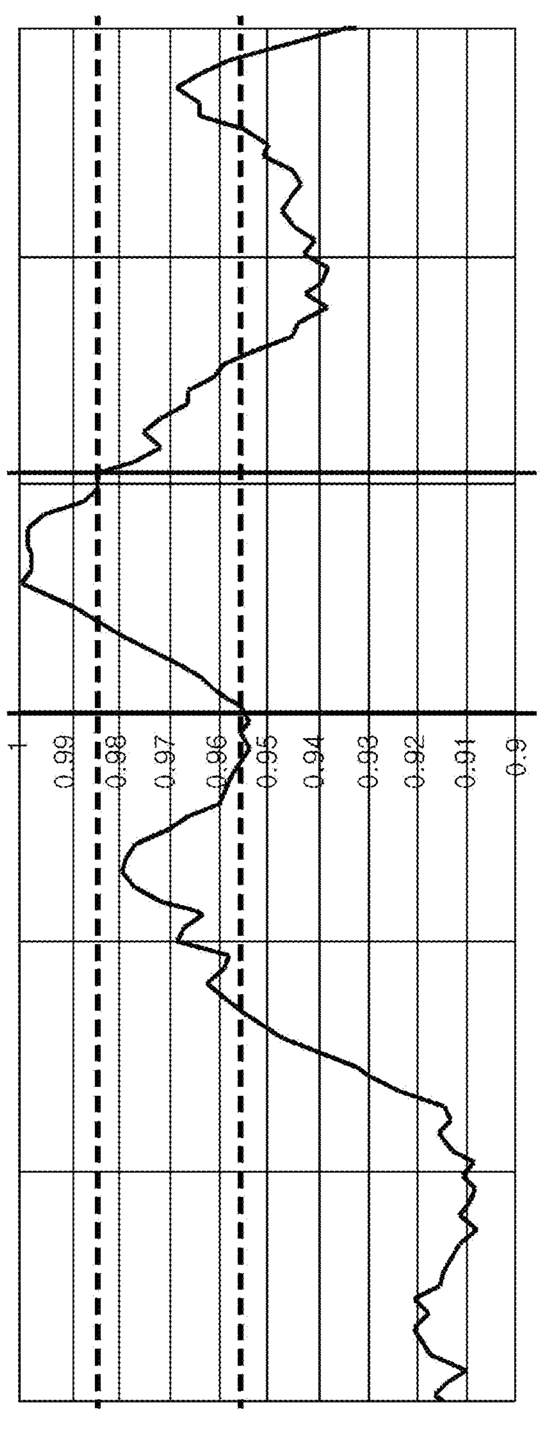

Referring to FIG. 19, it shows an example of the luminance difference in the case where the diffusion plate 129 has a transmittance of 30% due to the cavity C. It can be seen that the luminance difference of the light passing through the diffusion plate 129 due to the cavity C is 3%. The total amount of luminance increases to 101.5%.

Figure 20:
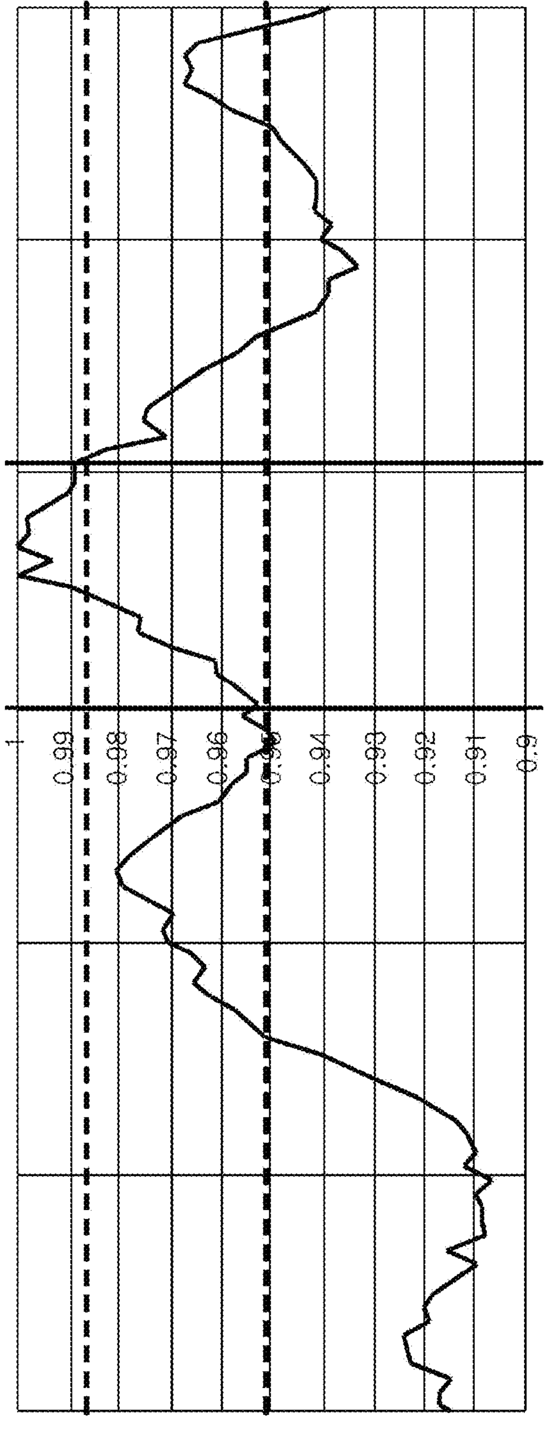

Referring to FIG. 20, it shows an example of the luminance difference in the case where the diffusion plate 129 has a transmittance of 35% due to the cavity C. It can be seen that the luminance difference of the light passing through the diffusion plate 129 due to the cavity C is 3.4%. The total amount of luminance increases to 103%.

Figure 21:
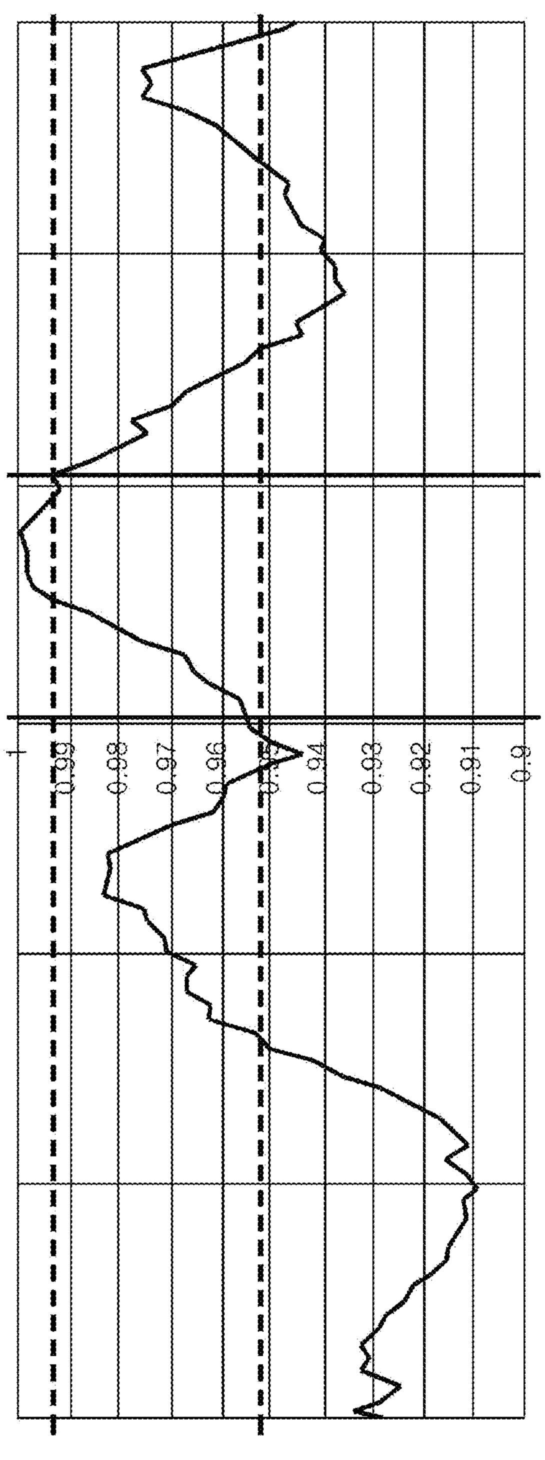

Referring to FIG. 21, it shows an example of the luminance difference in the case where the diffusion plate 129 has a transmittance of 40% due to the cavity C. It can be seen that the luminance difference of the light passing through the diffusion plate 129 due to the cavity C is 3.9%. The total amount of luminance increases to 105.5%.

Figure 22:
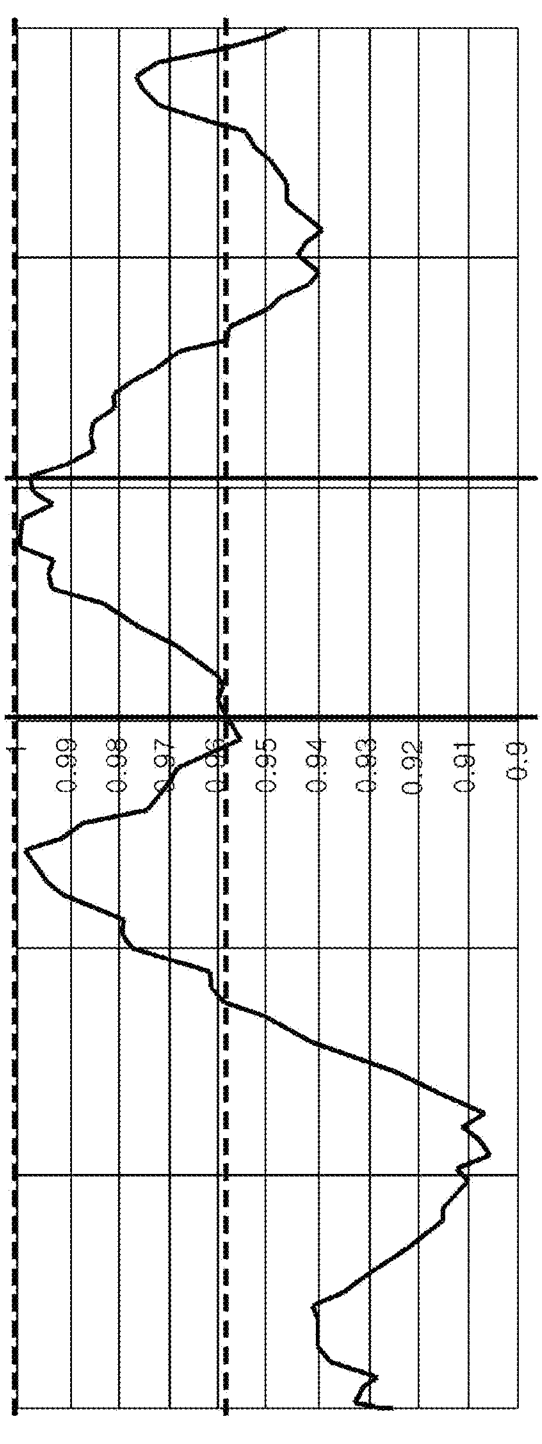

Referring to FIG. 22, it shows an example of the luminance difference in the case where the diffusion plate 129 has a transmittance of 45% due to the cavity C. It can be seen that the light passing through the diffusion plate 129 due to the cavity C is 4%. The total amount of luminance increased to 107%.

Figure 23:
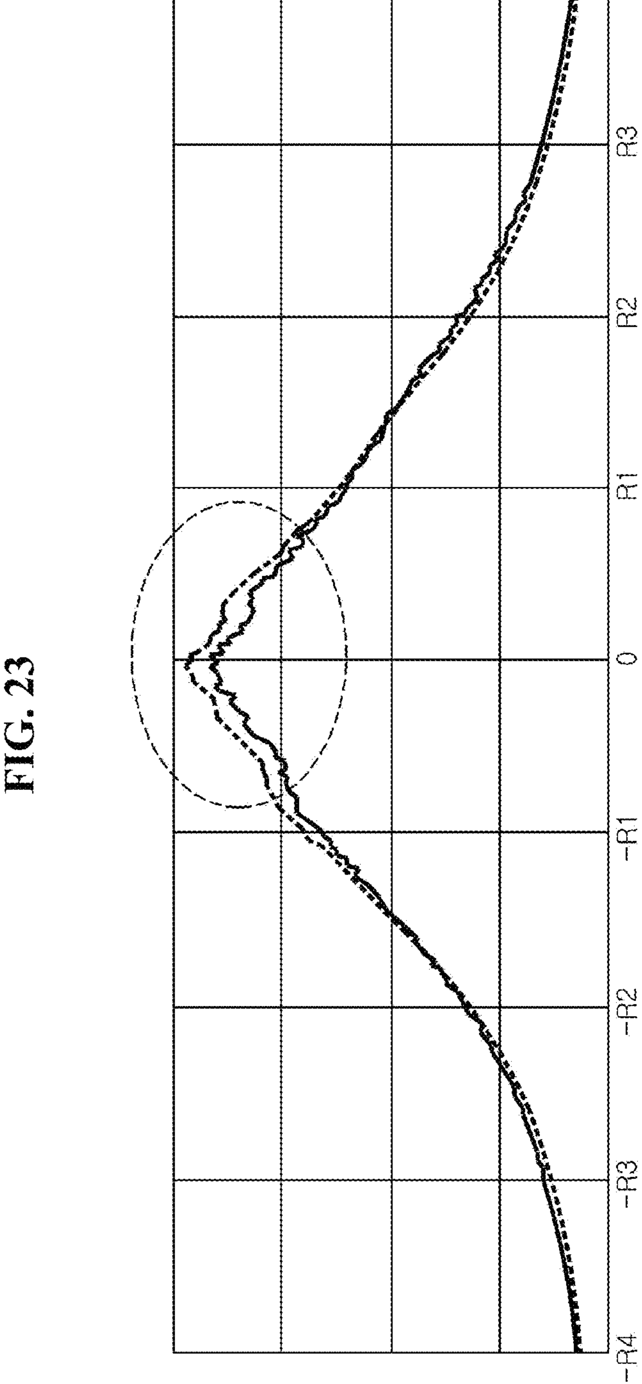

Referring to FIG. 23, it shows an example of a light profile passing through the diffusion plate 129 (solid line) having the cavity C described above compared to a general diffusion plate (dotted line). The X-axis indicates the distance in the radial direction around the optical assembly 124, and the Y-axis indicates the magnitude of luminance of the upper side of the optical assembly 124. It can be seen that the light diffusion and the inflection point of luminance difference (dotted circle) are alleviated (gentled, peak lowered) on the upper surface of the optical assembly 124.

Figure 24:
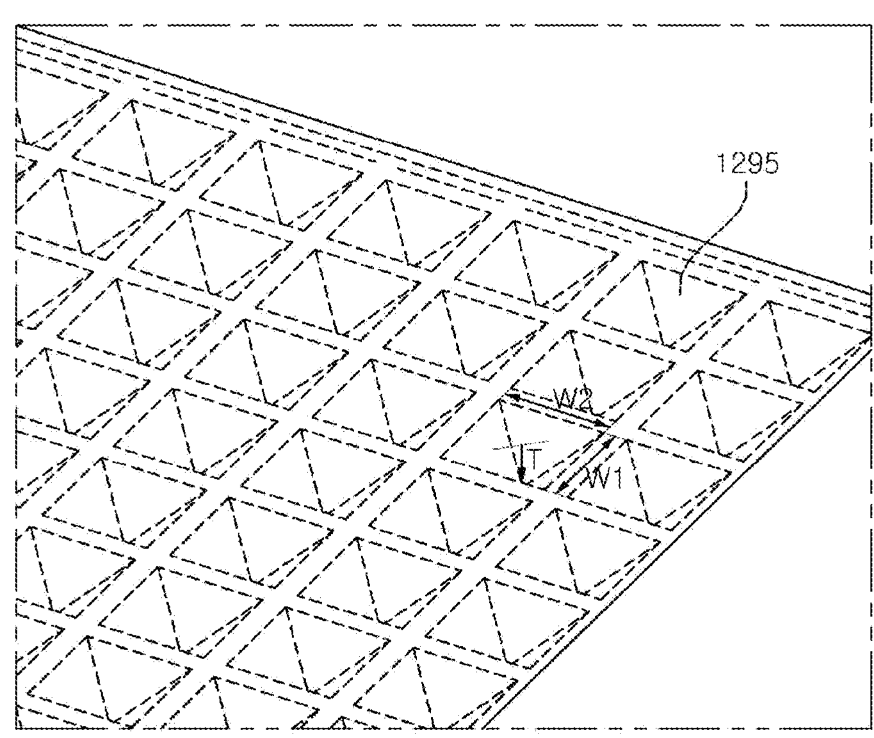
FIGS. 24 to 28 are diagrams illustrating examples of a display device having a backlight unit according to embodiments of the present disclosure.

Referring to FIG. 24, the diffusion plate 129 may have a pattern 1295. The pattern 1295 may be formed on one surface of the diffusion plate 129. The pattern 1295 may be formed on the lower surface and/or upper surface of the diffusion plate 129. The pattern 1295 may be engraved or may be embossed. For example, the shape forming the pattern 1295 may be a pyramid. The width W1, W2 of the base of the pyramid shape may be 0.26 millimeters, and the height T or depth T may be 0.3 millimeters.

Figure 25:
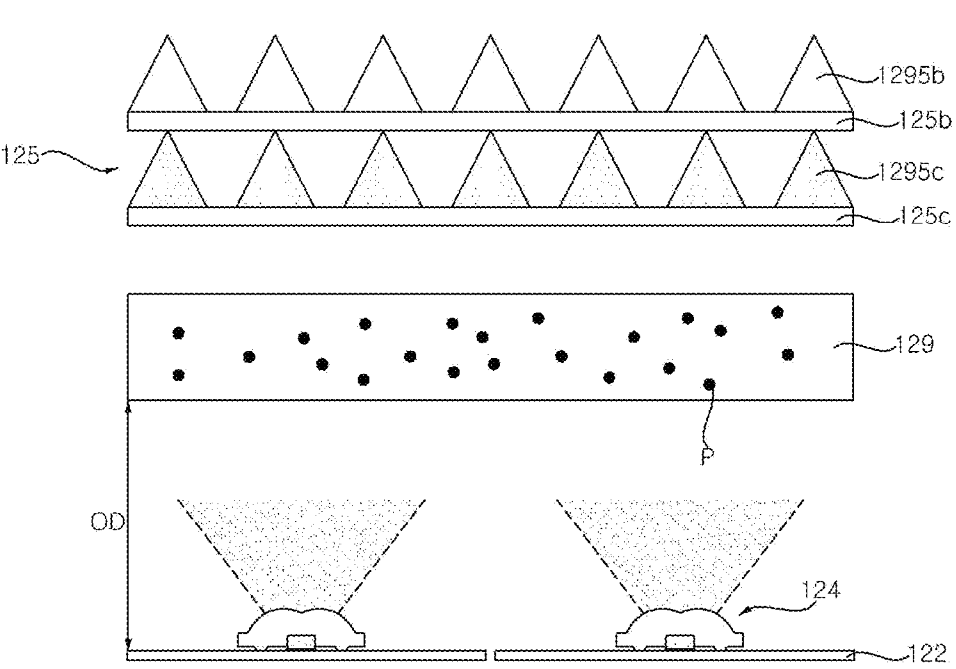

Referring to FIG. 25, the diffusion plate 129 may include diffusion particles P. The optical sheet 125 may include the pattern 1295 (see FIG. 24). The optical sheet 125 may be a prism sheet or a diffusion sheet. The pattern 1295 may be formed on the upper surface of the optical sheet 125. The pattern 1295 in the shape of a quadrangular pyramid may be formed on the upper surface of the optical sheet 125. For example, the pattern 1295 may be embossed. The pattern 1295 may include phosphors RP, GP.

The first optical sheet 125*c* may be located on the upper side of the diffusion plate 129. For example, the first optical sheet 125*c* may be a prism sheet. A first pattern 1295*c* may be formed on the upper surface of the first optical sheet 125*c*. The first pattern 1295*c* may include phosphors RP, GP. For example, the first pattern 1295*c* may have a pyramid shape.

The second optical sheet 125*b* may be laminated on the first optical sheet 125*c*. For example, the second optical sheet 125*b* may be a diffusion sheet. A second pattern 1295*b* may be formed on the upper surface of the second optical sheet 125*b*. For example, the second pattern 1295*b* may have a pyramid shape. The second pattern 1295*b* may be aligned with the first pattern 1295*c*.

The light provided from the optical assembly 124 may be directed toward the diffusion plate 129 and may pass through the diffusion plate 129 and the optical sheet 125. For example, the optical depth (OD) may be 16 millimeters.

Figure 26:
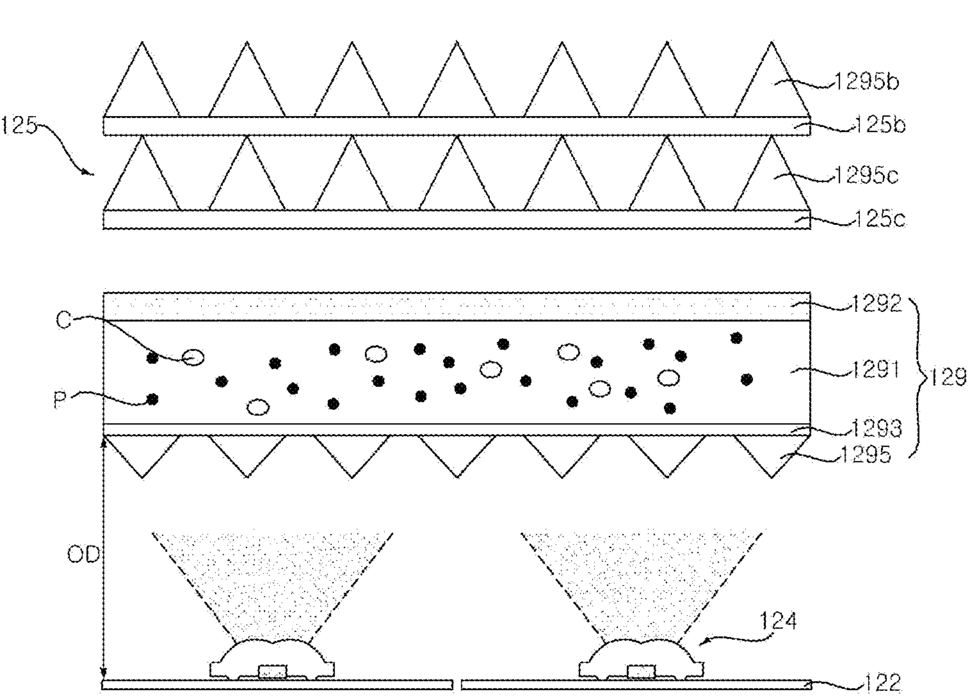

Referring to FIG. 26, the diffusion plate 129 may include diffusion particles P and cavities C. The diffusion plate 129 may include a core 1291, a first skin 1292, and a second skin 1293. The core 1291 may include diffusion particles P and cavities C. The first skin 1292 may be stacked or laminated on the upper surface of the core 1291. The first skin 1292 may be adhered to or coated on the upper surface of the core 1291. The first skin 1292 may include phosphors RP, GP. The first skin 1292 may be referred to as an absorption layer 1292.

The second skin 1293 may be adhered to or coated on the lower surface of the core 1291. The second skin 1293 may include a pattern 1295 (see FIG. 24). The pattern 1295 may be formed on the lower surface of the second skin 1293. The thickness of the first skin 1292 may be greater than the thickness of the second skin 1293. The thickness of the core 1291 may be greater than the thickness of the first skin 1292. The second skin 1293 may be referred to as a skin layer 1293.

The optical sheet 125 may include a pattern 1295*b*, 1295*c*. The optical sheet 125 may be a prism sheet or a diffusion sheet. The pattern 1295*b*, 1295*c* may be formed on the upper surface of the optical sheet 125. The pattern 1295*b*, 1295*c* in a quadrangular pyramid shape may be formed on the upper surface of the optical sheet 125. For example, the pattern 1295*b*, 1295*c* may be embossed.

The first optical sheet 125*c* may be located on the upper side of the diffusion plate 129. For example, the first optical sheet 125*c* may be a prism sheet. The first pattern 1295*c* may be formed on the upper surface of the first optical sheet 125*c*. For example, the first pattern 1295*c* may be in a pyramid shape.

The second optical sheet 125*b* may be stacked or laminated on the first optical sheet 125*c*. For example, the second optical sheet 125*b* may be a diffusion sheet. A second pattern 1295*b* may be formed on the upper surface of the second optical sheet 125*b*. For example, the second pattern 1295*b* may have a pyramid shape. The second pattern 1295*b* may be aligned with the first pattern 1295*c*.

The light provided from the optical assembly 124 may be directed toward the diffusion plate 129, and may pass through the diffusion plate 129 and the optical sheet 125. For example, the optical depth (OD) may be 16 millimeters.

Figure 27:
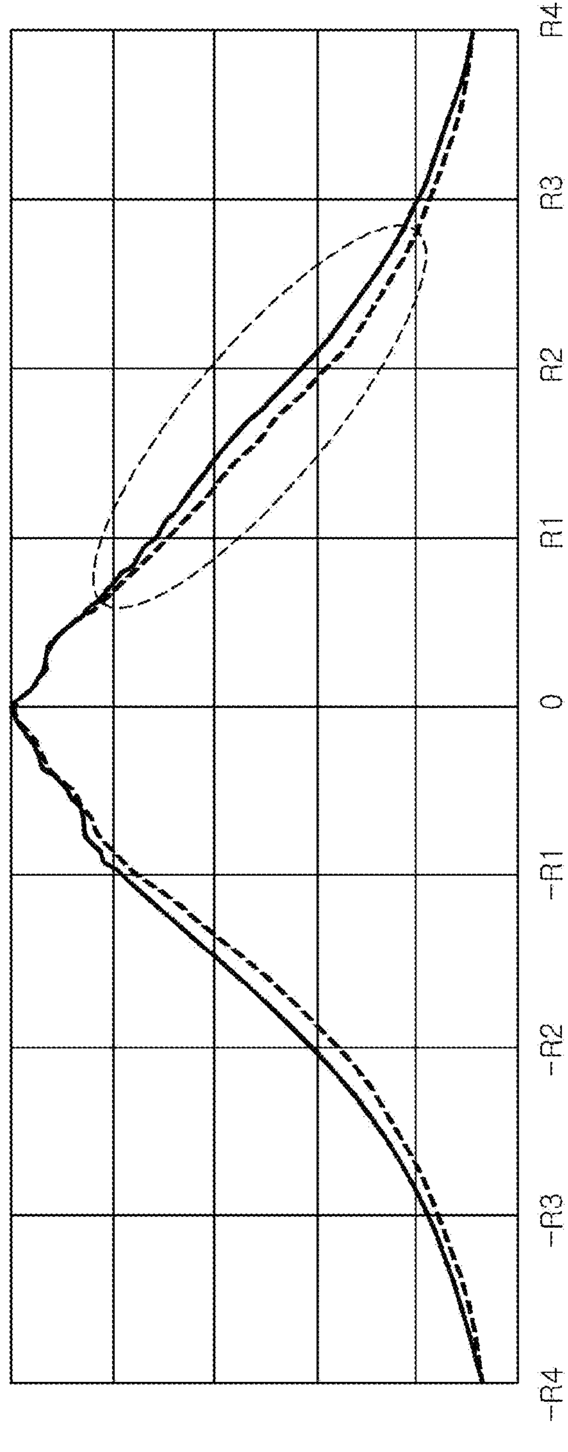
Figure 28:
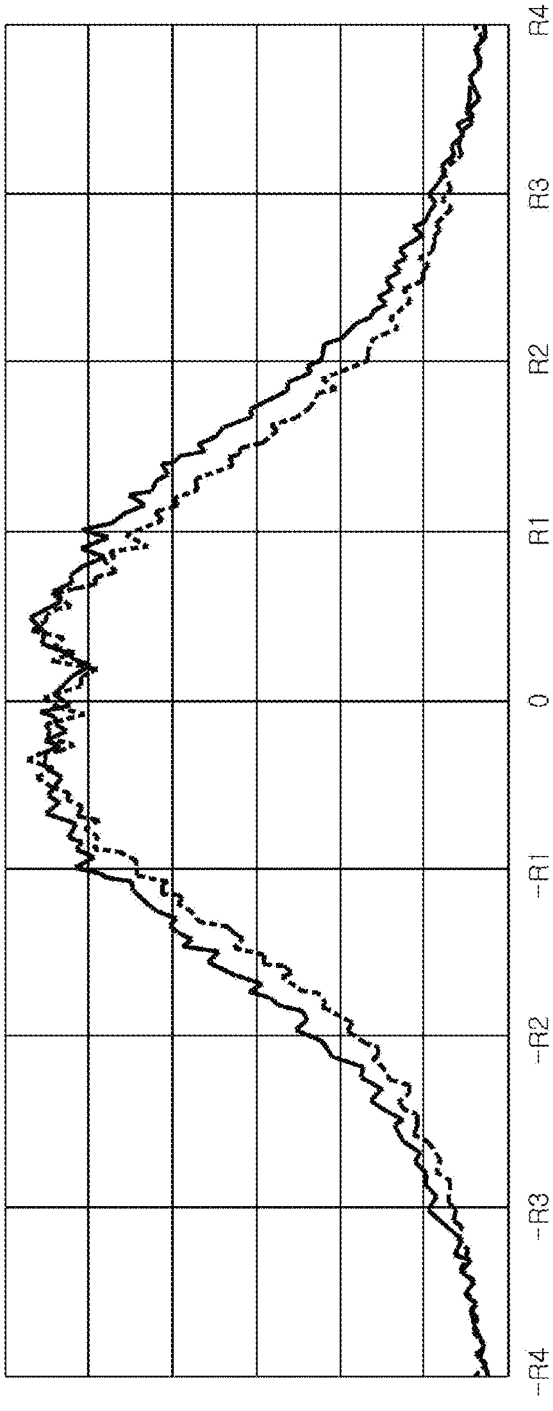

Referring to FIGS. 27 and 28, the dotted line indicates a luminance profile provided by the backlight unit in which the cavity C and/or the pattern 1295 is not formed, and the solid line indicates a luminance profile provided by the backlight unit according to the above-described embodiments, for example, the embodiment described with reference to FIG. 26. The X-axis indicates a distance in the radial direction from the center of the optical assembly 124 (sec FIGS. 25 and 26), and the Y-axis indicates the magnitude of the luminance of the optical assembly 124.

In FIG. 27, in the elliptical dotted line area, it can be seen that the coverage of the light profile is improved and the diffusion power is improved.

In FIG. 28, it can be seen that the luminance of the backlight unit is improved.

Accordingly, it is possible not only to improve the luminance of the backlight unit, but also to improve the color reproducibility of the display device, thereby improving the image quality.

Referring to FIGS. 1 to 28, the display device includes: a display panel 110; an optical assembly 124 which provides blue light to the display panel 110; and a diffusion plate 129 which includes an absorption layer 116, 1292 that is located between the display panel 110 and the optical assembly 124, and absorbs light having a wavelength of certain range, in which, in a light provided to the display panel 110 through the absorption layer 116, 1292, an intensity of green-based light is 20% to 70% of an intensity (100%) of the blue-based light, and an intensity of red-based light is 20% to 70% of the intensity of the blue-based light, in which the diffusion plate 129 includes: a core plate 1291 having light-transmitting properties; and a skin layer 1293 located on a lower surface of the core plate 1291, in which the absorption layer 116, 1292 is opposite to the skin layer 1293 with respect to the core plate 1291.

The core plate 1291 includes: a diffusion particle P located inside the core plate 1291; and a cavity C formed inside the core plate 1291.

The light absorption layer 116, 1292 includes a green phosphor GP and a red phosphor RP, in which, in the light provided to the display panel 110 through the absorption layer 116, 1292, the intensity of green-based light is 35 to 40% of the intensity of the blue-based light, and the intensity of red-based light is 21 to 28% of the intensity of the blue-based light.

A thickness of the light absorption layer 116, 1292 is greater than a thickness of the skin layer 1293, and a thickness of the core plate 1291 is greater than the thickness of the light absorption layer 116, 1292.

A size of the cavity C is greater than a size of the diffusion particle P.

The light absorption layer 116, 1292 is adhered to an upper surface of the core plate 1291, and the skin layer 1293 is adhered to a lower surface of the core plate 1291.

The skin layer 1293 of the diffusion plate 129 includes a pattern 1295 that is formed on an outer surface of the skin layer 1293, in which the pattern 1295 is engraved or embossed on the outer surface of the skin layer 1293.

The pattern 1295 has a quadrangular pyramid shape, a width W1, W2 of lower side of the pattern 1295 is 0.2 to 0.3 millimeters, and a depth T or height T of the pattern 1295 is 0.2 to 0.4 millimeters.

A peak of a wavelength of the blue-based light is 443 to 450 nm, a peak of a wavelength of the red-based light is 610 to 630 nm, and a peak of a wavelength of the green-based light is 535 to 545 nm, and a full width at half maximum of the green-based light is 35 to 45 nm.

A color temperature of an image provided from a front surface of the display panel 110 is 10,000 to 12,000 K.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments may be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:

a display panel;

an optical assembly which provides blue-based light to the display panel; and a diffusion plate which comprises an absorption layer that is located between the display panel and the optical assembly, and absorbs light having a wavelength of certain range, wherein, in a light provided to the display panel through the absorption layer, an intensity of green-based light is 20% to 70% of an intensity (100%) of the blue-based light, and an intensity of red-based light is 20% to 70% of the intensity of the blue-based light, wherein the diffusion plate comprises:

a core plate having light-transmitting properties; and a skin layer located on a lower surface of the core plate, wherein the absorption layer is opposite to the skin layer with respect to the core plate, wherein the core plate comprises:

a diffusion particle located inside the core plate; and a cavity formed inside the core plate, wherein a thickness of the absorption layer is greater than a thickness of the skin layer, and a thickness of the core plate is greater than the thickness of the absorption layer, wherein the skin layer of the diffusion plate includes a pattern that is formed on an outer surface of the skin layer, wherein the pattern is engraved or embossed on the outer surface of the skin layer, wherein the pattern has a quadrangular pyramid shape, a width of lower side of the pattern is 0.2 millimeters to 0.3 millimeters, and a depth or height of the pattern is 0.2 millimeters to 0.4 millimeters.

2. The display device of claim 1, wherein the absorption layer comprises a green phosphor and a red phosphor, wherein, in the light provided to the display panel through the absorption layer, the intensity of green-based light is 35% to 40% of the intensity of the blue-based light, and the intensity of red-based light is 21% to 28% of the intensity of the blue-based light.

3. The display device of claim 1, wherein a size of the cavity is greater than a size of the diffusion particle.

4. The display device of claim 1, wherein the absorption layer is adhered to an upper surface of the core plate, and the skin layer is adhered to a lower surface of the core plate.

5. The display device of claim 1, wherein a peak of a wavelength of the blue-based light is 443 nm to 450 nm, a peak of a wavelength of the red-based light is 610 nm to 630 nm, and a peak of a wavelength of the green-based light is 535 nm to 545 nm, and a full width at half maximum of the green-based light is 35 nm to 45 nm.

6. The display device of claim 1, wherein a color temperature of an image provided from a front surface of the display panel is 10,000 K to 12,000 K.

* * * * *